(12) United States Patent
Millsap et al.

(10) Patent No.: US 12,284,947 B2
(45) Date of Patent: Apr. 29, 2025

(54) MID-SIZE OR BIG BALE STACK FEEDER BED WAGON HAVING A BALE LOADER ARM ASSEMBLY INTERCHANGEABLE WITH A BALE KNIFE ASSEMBLY

(71) Applicant: MIL-STAK MANUFACTURING CO., LLLP, Fruitland, ID (US)

(72) Inventors: Leland K. Millsap, Fruitland, ID (US); Randall R. Clagg, Payette, ID (US)

( * ) Notice: Subject to any disclaimer, the term of this patent is extended or adjusted under 35 U.S.C. 154(b) by 206 days.

(21) Appl. No.: 18/130,414

(22) Filed: Apr. 3, 2023

(65) Prior Publication Data

US 2023/0309455 A1   Oct. 5, 2023

Related U.S. Application Data

(60) Provisional application No. 63/326,912, filed on Apr. 3, 2022.

(51) Int. Cl.
   *A01D 90/02* (2006.01)
   *A01D 90/10* (2006.01)

(52) U.S. Cl.
   CPC ............ *A01D 90/02* (2013.01); *A01D 90/10* (2013.01)

(58) Field of Classification Search
   CPC .. A01D 87/127; A01D 87/0084; A01D 90/08; A01D 90/12; A01D 90/02
   See application file for complete search history.

(56) References Cited

U.S. PATENT DOCUMENTS

| | | | | |
|---|---|---|---|---|
| 2,848,127 A | * | 8/1958 | Grey | A01D 90/08 56/473.5 |
| 3,631,992 A | * | 1/1972 | Dickinson | B65G 59/00 414/789.3 |
| 4,370,796 A | * | 2/1983 | Wilson | A01D 90/08 83/563 |
| 4,771,670 A | * | 9/1988 | Woerman | A01D 87/127 144/1.1 |
| 4,789,289 A | * | 12/1988 | Wilson | A01D 90/083 241/101.76 |
| 5,025,992 A | * | 6/1991 | Niebur | A01D 87/127 241/101.76 |
| 5,725,346 A | * | 3/1998 | Davina | A01D 90/08 280/491.1 |

(Continued)

FOREIGN PATENT DOCUMENTS

| | | | | |
|---|---|---|---|---|
| CN | 112825679 A | * | 5/2021 | ........... A01D 85/001 |
| FR | 2743690 A1 | * | 7/1997 | ............. A01D 90/08 |
| WO | WO-2018009949 A1 | * | 1/2018 | ........... A01D 87/122 |

*Primary Examiner* — Kaitlin S Joerger
(74) *Attorney, Agent, or Firm* — Charles R. Clark

(57) ABSTRACT

A stack feeder bed wagon is provided for pickup of one or more mid-size or big bales in an agricultural field for transport that simultaneously tilts and rotates a longitudinal bale 90 degrees upwardly and transversely over, adjacent, and along the forward upper edge of a stack bed for pushback onto the bed for transport or for consolidation with one or more bales into a single layer stack load on the bed that can be offloaded from the wagon for later pickup or that can be transported for deposit in a different place; and the wagon can be used for the retrieval of a load from a storage surface and when interchangeably equipped with a bale knife assembly that selectively cooperates with a bale moving crossfeed cable system can provide a series of bale segments to feed animals.

1 Claim, 20 Drawing Sheets

(56) References Cited

U.S. PATENT DOCUMENTS

| | | | |
|---|---|---|---|
| 10,681,871 B1* | 6/2020 | Fay, II | A01D 90/08 |
| 2002/0090281 A1* | 7/2002 | Siebenga | A01D 85/005 |
| | | | 414/556 |
| 2006/0251501 A1* | 11/2006 | Koehn | A01D 90/08 |
| | | | 414/501 |
| 2017/0202147 A1* | 7/2017 | Millsap | B65G 57/28 |
| 2017/0273246 A1* | 9/2017 | Fay, II | A01D 85/005 |
| 2021/0051857 A1* | 2/2021 | Smith | A01D 87/127 |
| 2023/0132610 A1* | 5/2023 | Cochran | A01D 90/083 |
| | | | 414/24.5 |

* cited by examiner

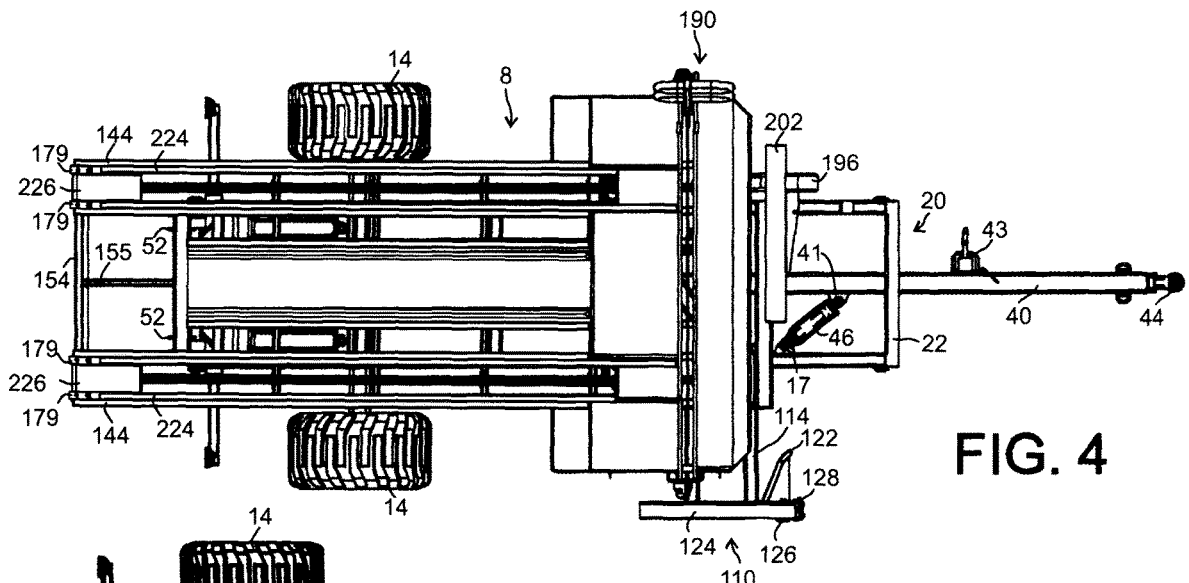
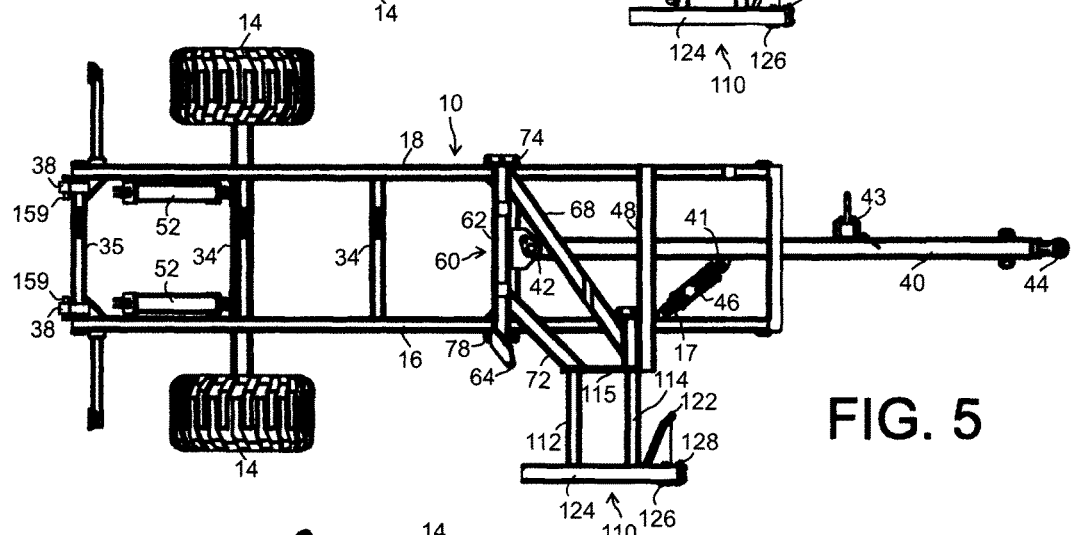
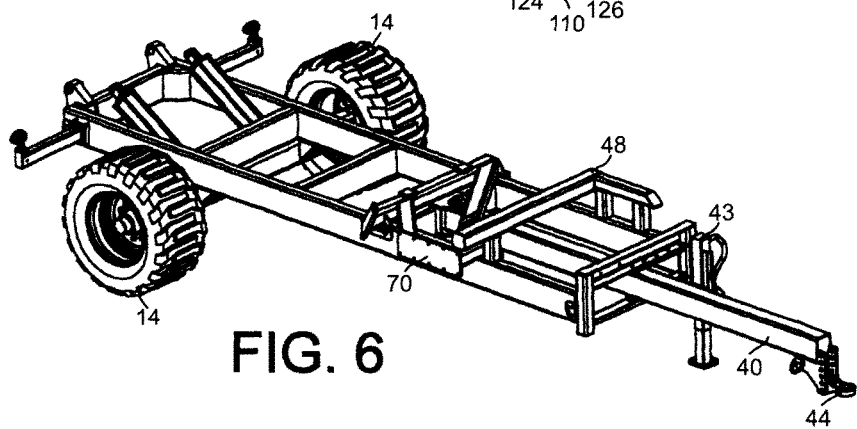

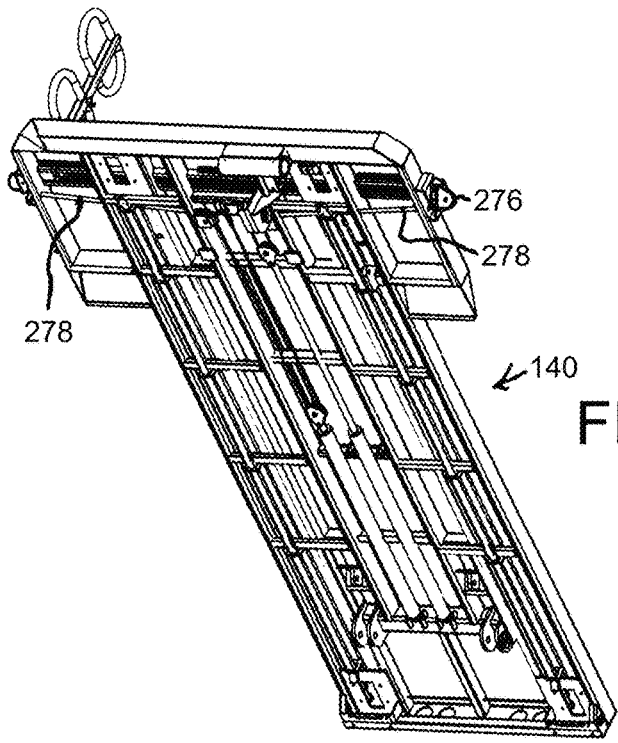
FIG. 21
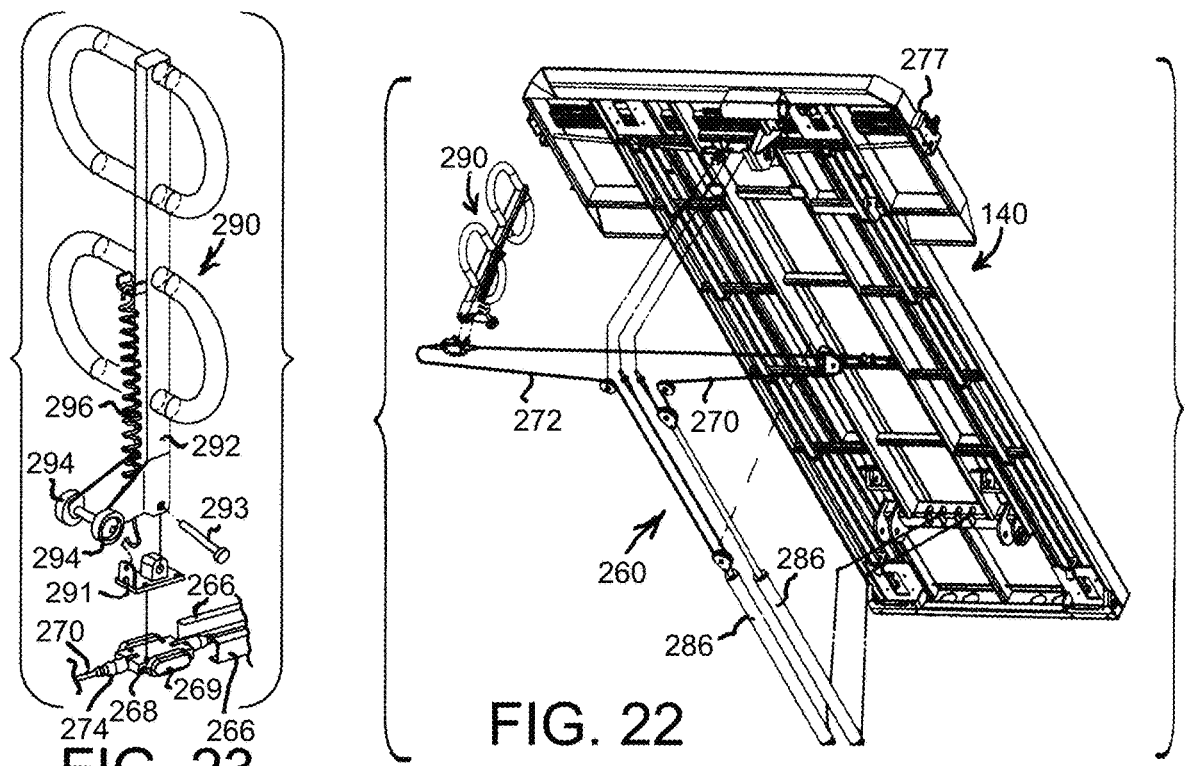
FIG. 23
FIG. 22

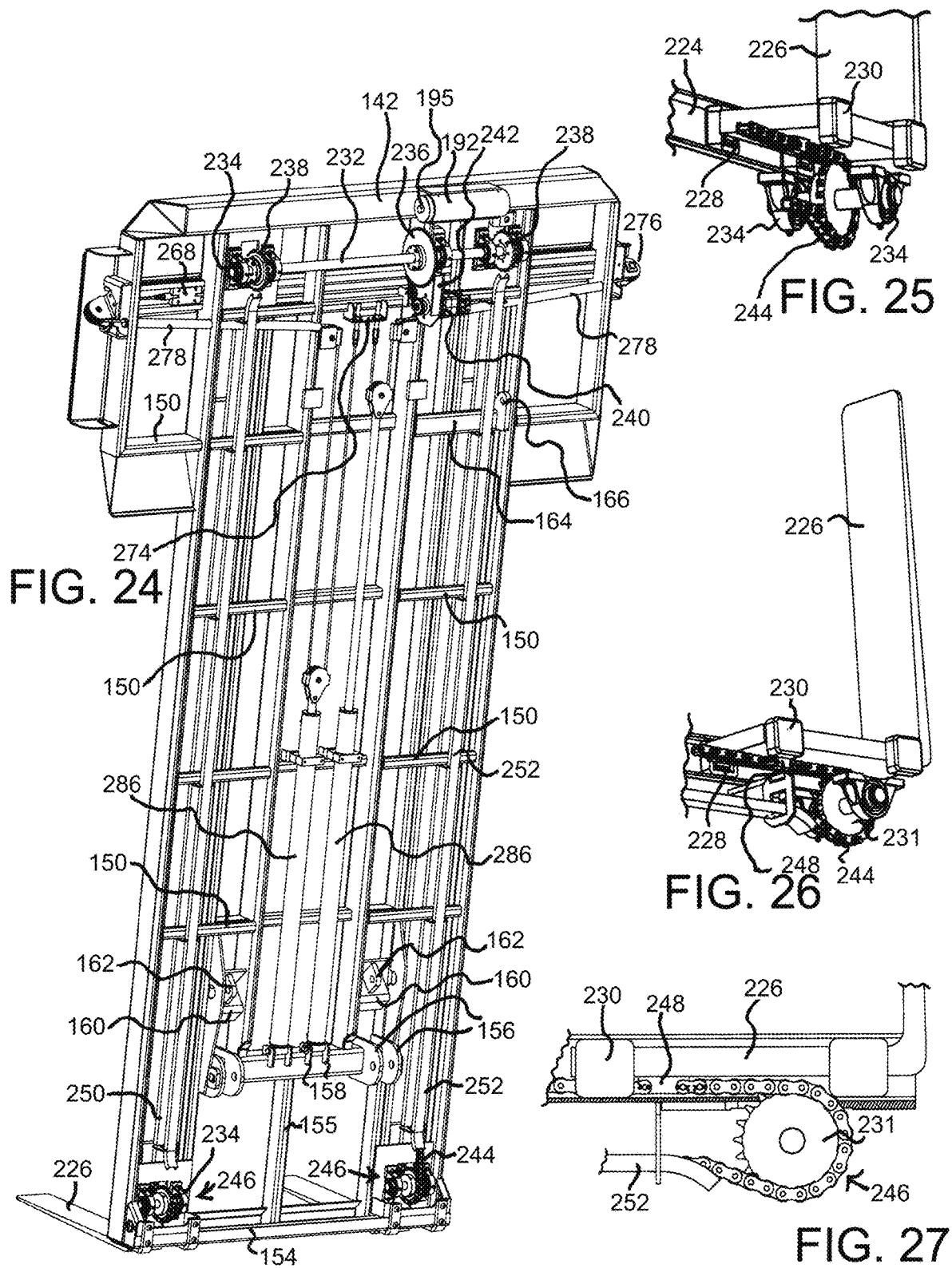

MID-SIZE OR BIG BALE STACK FEEDER BED WAGON HAVING A BALE LOADER ARM ASSEMBLY INTERCHANGEABLE WITH A BALE KNIFE ASSEMBLY

CROSS-REFERENCE TO RELATED APPLICATIONS

This application claims the benefit of U.S. Provisional Application No. 63/326,912, filed Apr. 3, 2022.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to a novel mid-size or big bale stack feeder bed wagon 8 that incorporates a novel bale loader arm assembly 80 interchangeable with a bale knife assembly 110. The bale loader arm assembly 80 is interchangeable with the said knife assembly 110; and selectively either said loader arm assembly or said knife assembly is operatively and reversibly attached to an accessory mount assembly 60 mounted to a forward portion of a lower support frame assembly 10 of the stack feeder bed wagon. When in use in an agricultural setting such as a hay bale harvest field, the loader arm assembly clasps a mid-size or big bale that is oriented longitudinally along the direction of wagon travel in the harvest field; simultaneously lifts and rotates the clasped bale approximately 90 degrees up and approximately 90 degrees horizontally and places the bale across a forward portion of a bale stack feeder bed assembly 140 of the wagon and stabilizes the bale until the bale is engaged and pushed rearward along the stack feeder bed assembly by a pushback pivot arm 202 (bale pushback cross member 206) of a bale pushback and stack clamping assembly 190 that is attached to a front portion of the stack feeder bed assembly.

Field of the Invention

The present invention relates to providing a novel bale stack feeder bed wagon 8 (bale pickup transport and feeder vehicle) that incorporates a novel bale loader arm assembly 80 that picks up a mid-size or big bale from the ground and simultaneously tilts and rotates the bale from a fore and aft orientation (parallel to the direction of wagon travel) to a transverse orientation (across the front portion of the wagon) with the bale surface that was on the ground tilted up and rotated 90 degrees to become the forward transverse surface of the picked-up bale that is towards the front of the wagon. Thereafter, selectively said loader arm assembly can be quickly and easily detached and interchanged with a bale knife assembly 110; thereby providing a useful bale feeder wagon (vehicle).

BRIEF SUMMARY OF THE INVENTION

The invention enables the lifting, rotating, and depositing of one mid-size or big bale or a plurality of mid-size or big bales from a work surface (the ground) to a stack feeder bed assembly 140 of the wagon for consolation into a stack load with other bales for transport from the field. The invention allows selective 90 degree rotation of a bale around two axes from the ground onto a stack feeder bed assembly. The present invention is a novel modification to the stack bed wagon disclosed in the Millsap patent (U.S. Pat. No. 10,136,581) issued to one of the present inventors. The disclosure in the U.S. Pat. No. 10,136,581 patent is incorporated by reference herein.

The invention allows the interchangeable substitution of a bale knife assembly 110 in place of a bale loader arm assembly 80 to enable the stack feeder bed wagon to be used to distribute serially, cleaved portions of a single feed bale or serially a plurality of bales—one cleaved portion at a time—to cattle, horses or other animals to be fed in a field, pasture, clearing or other selected feeding location.

A principal objective of this invention is to provide a novel mid-size or big bale stack feeder bed wagon that is lightweight, compact, simple, low-maintenance, and reliable for use in a system that permits a farmer or other user to use a more economical and useful agricultural harvesting and feeding tool.

Additional and various other objects and advantages attained by the invention will become more apparent as the specification is read and the accompanying figures are reviewed.

The mid-size or big bale stack feeder bed wagon 8 in the preferred embodiment selectively uses six to eight hydraulic actuators. Each actuator requires the hook up of two hydraulic lines. The up to 16 hydraulic lines preferably are powered in a manner well understood in the hydraulic power art by a hydraulic system on a prime mover (a farm tractor) hitched to the wagon. The selective control of the invention's actuators may be accomplished by selective manual controls or by appropriate software of a control system that controls the hydraulic system of the prime mover to control the six to eight actuators in a manner generally known in the hydraulic power art. In FIGS. 1 to 51, the hydraulic lines are generally not shown to allow viewing of invention elements that would otherwise be obscured.

The preferred embodiment uses hydraulic actuators, but other comparable devices including pneumatic actuators could be used.

BRIEF DESCRIPTION OF THE SEVERAL VIEWS OF THE DRAWING

FIG. 4 is a top plan view of the stack feeder bed wagon 8 shown in FIG. 1 showing the wagon draw bar 40 aligned at a selected angle along the longitudinal center axis of the wagon and showing the bale knife assembly 110 in the knife arm 124 down position, showing the stack feeder bed assembly 140 in the bed down position, and showing the bale pushback and stack clamping assembly 190 in a pushback pivot arm up position;

FIG. 5 is a top plan view of a lower support frame assembly 10 having a bale knife assembly 110 in the knife arm down position, said knife support frame face plate 115 attached to said mount face plate 70 by nuts and bolts (the stack feeder bed assembly is not shown);

FIG. 6 is a perspective view from above the right front of the lower support frame assembly 10 shown in FIG. 5 with said bale knife assembly removed and showing said mount face plate 70 available for selective interchangeable attachment of either said bale knife assembly or said loader arm assembly to be attached by nuts and bolts to said mount face plate;

FIG. 21 is a partial perspective view from below and from the left of the stack feeder bed assembly 140 shown in FIG. 17;

FIG. 22 is a partial, partially exploded perspective view from below and from the left of the stack feeder bed assembly 140 shown in FIG. 21 partially showing a bale moving crossfeed cable system 260 and a bale pusher fence assembly 290;

FIG. 23 is a partial, partially exploded perspective view from above of multiple components of said bale moving crossfeed cable system 260 showing portions of two crossfeed cables 270, 272, attached to a slidable shuttle block 268, a portion of a shuttle sliding track 262, a shuttle connector plate 291, a bale pusher fence assembly 290 having a fence post 292 and a pair of spaced coaxial wheels 294 spaced from and attached at the lower end of said fence post, two cable terminals 274 attached on opposite ends of said shuttle block each said terminal gripping an end of one of said crossfeed cables, and two slider blocks 269 mounted on opposite sides of said shuttle block (preferably said slider blocks are made of low friction UHMW plastic), and a tensioning spring 296 for operative attachment between said fence post and said shuttle connector plate;

FIG. 24 is a partial, perspective view from below the stack feeder bed assembly 140 shown in FIG. 21 showing two coaxial mounted spaced bale fork chain drive rearward sprocket wheel assemblies 246 below and transversely opposite one from the other attached to rear lower portions of said bed assembly and showing portions of two bale fork drive chains 244;

FIG. 25 is a partial, perspective view from below of one of said bale fork coaxial chain drive rearward sprocket wheel assemblies 230 of a bale fork chain drive assembly 220, each said rearward assembly having a respective drive sprocket wheel 231 with some bed structures not shown to allow viewing of a bale fork connecting lug 248 attached between and to opposing ends of two shown portions of a drive chain 244 of said bale fork chain drive assembly;

FIG. 26 is a partial, perspective view from below of one of the bale fork chain drive rearward sprocket wheel assemblies 246 shown in FIG. 24 with some bed structures not shown to allow viewing of a bale fork connecting lug 248 attached between and to opposing ends of two portions of a drive chain 244 of said bale fork chain drive assembly 220;

FIG. 27 is a partial side view of one of said bale fork chain drive sprocket wheel assemblies 246 shown in FIG. 24 with some bed structures not shown to allow viewing of a bale fork connecting lug 248 attached between and to opposing ends of two portions of a drive chain 244;

DETAILED DESCRIPTION OF THE INVENTION

Figure 1:
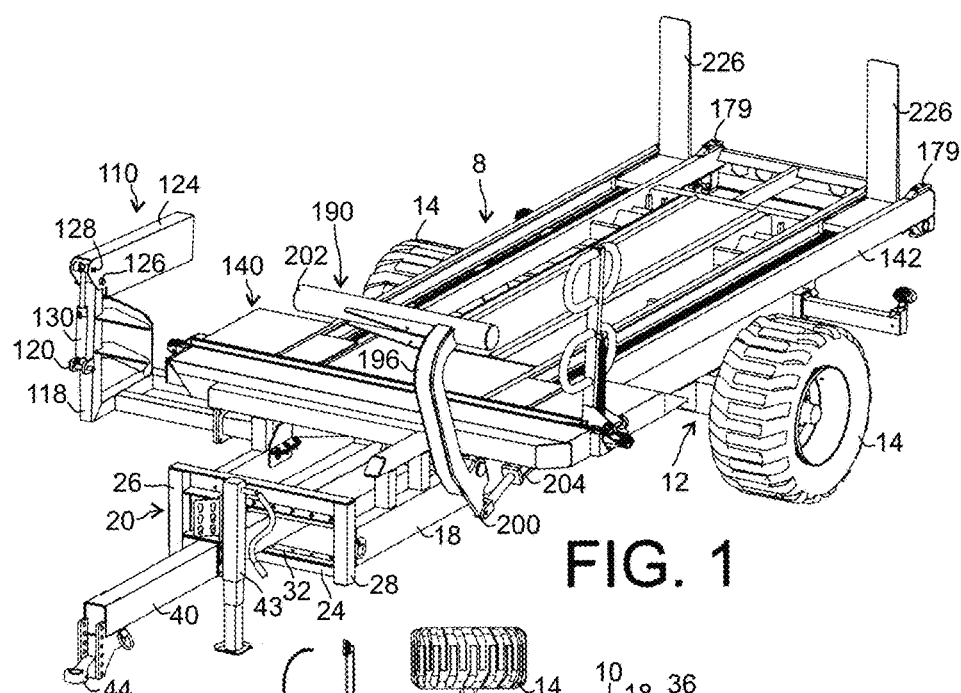
FIG. 1 is a perspective view from above the left front of a mid-size or big bale stack feeder bed wagon 8 showing a wagon draw bar 40 aligned right to left with the longitudinal center axis of the wagon and showing a bale knife assembly 110 in a knife arm down position, showing a stack feeder bed assembly 140 in a bed down position, and showing a bale pushback and stack clamping assembly 190 in a pushback pivot arm up position.
Figure 2:
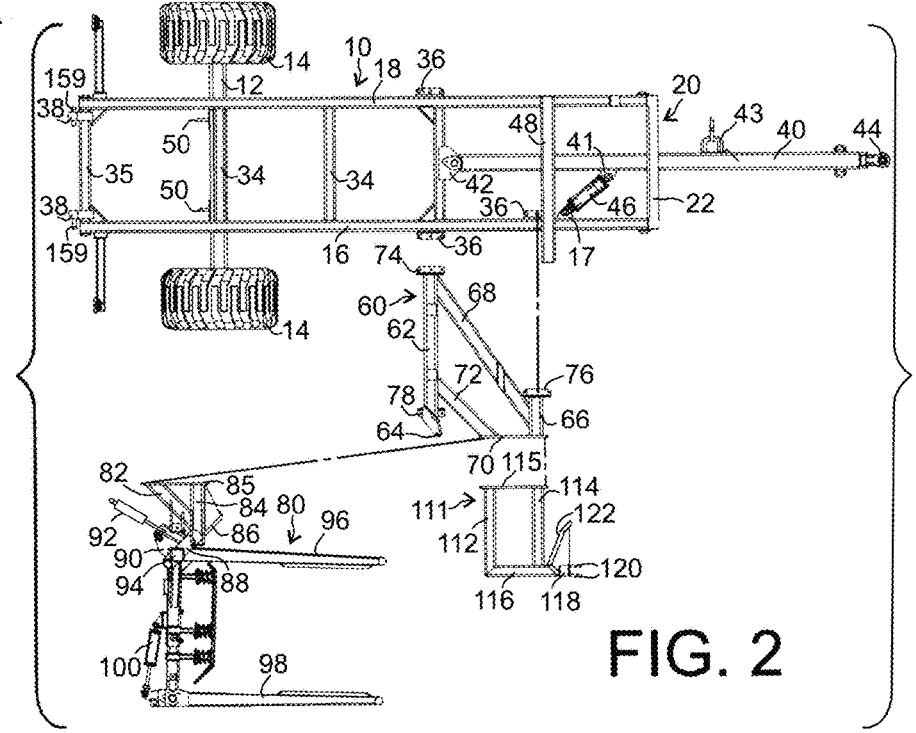
FIG. 2 is a partial, partially exploded top plan view of the lower support frame assembly 10, an accessory mount assembly 60 having a mount face plate 70, an interchangeable bale loader arm assembly 80, and a bale knife support frame assembly 111 of an interchangeable bale knife assembly 110.
Figure 3:
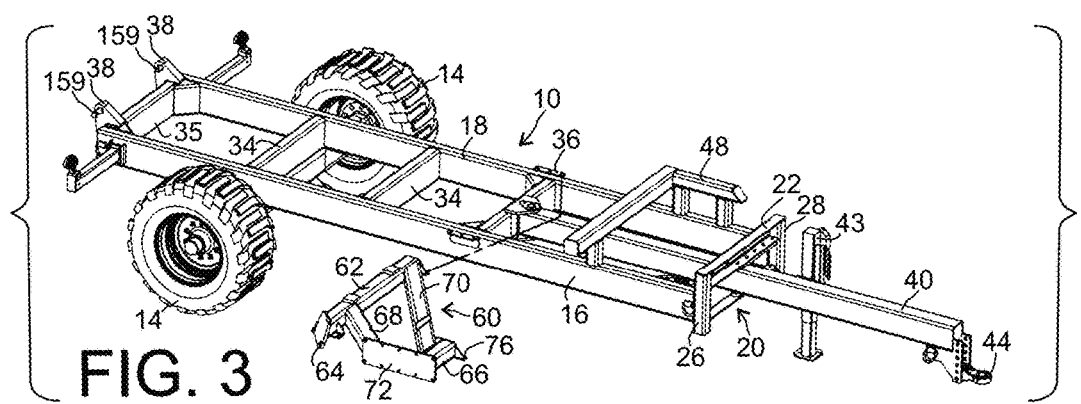
FIG. 3 is a partially exploded perspective view from above the right front of the lower support frame assembly 10 shown in FIG. 2.
Figure 7:
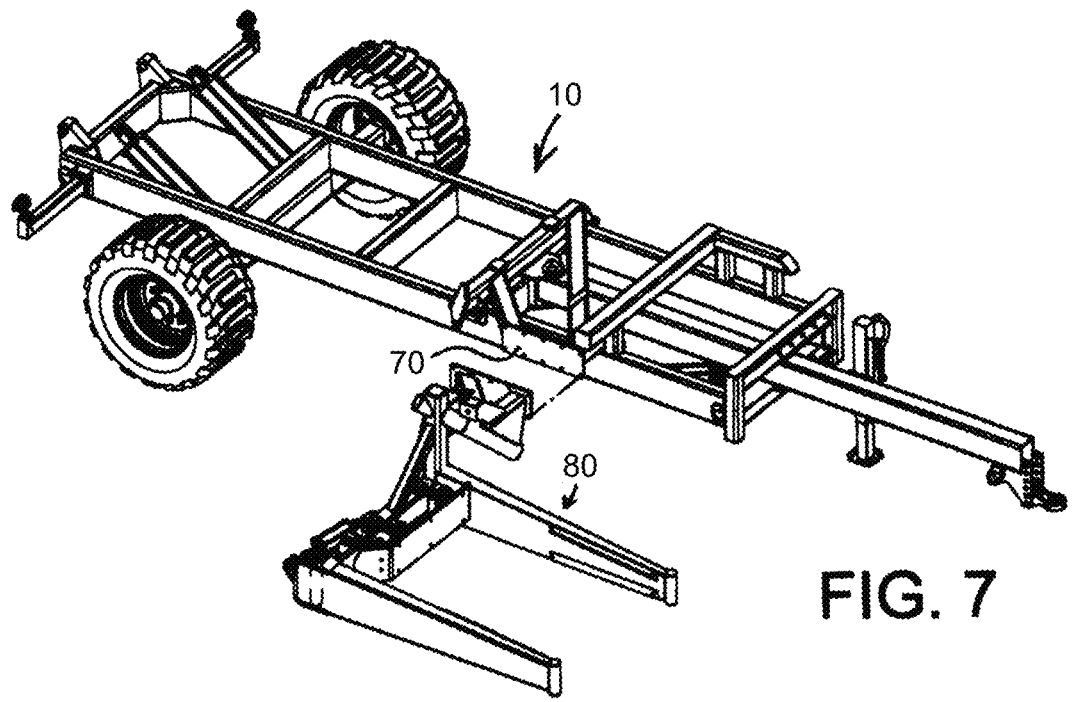
FIG. 7 is a partially exploded perspective view from above the lower support frame assembly 10 shown in FIG. 6 and with a loader arm assembly 80 to be attached to said mount face plate.
Figure 8:
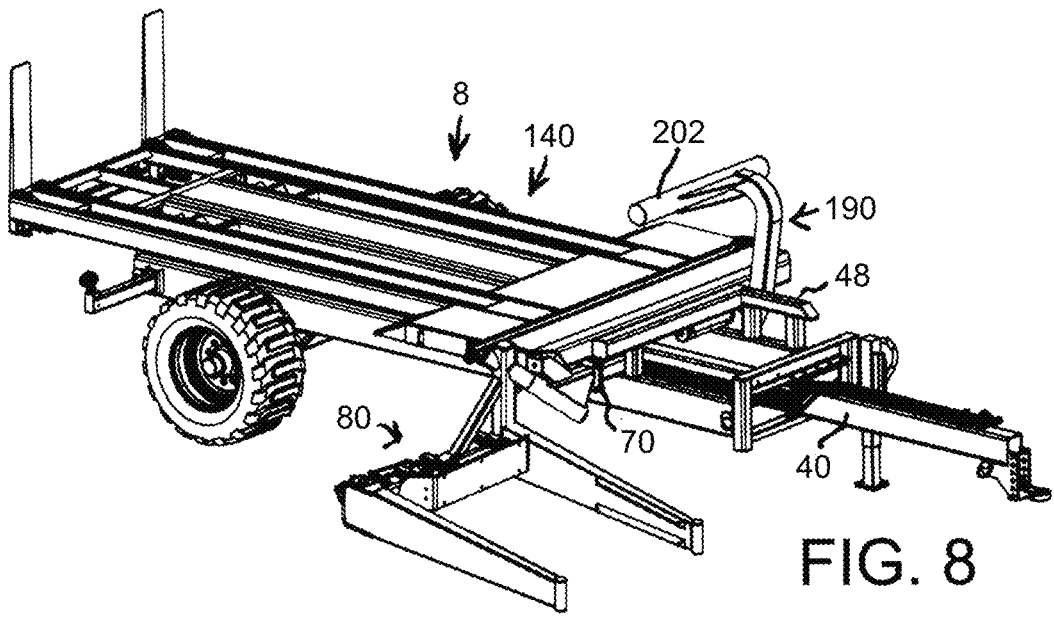
FIG. 8 is a perspective view from above the right front of a stack feeder wagon 8 showing a loader arm assembly 80 attached to a mount face plate 70.
Figure 9:
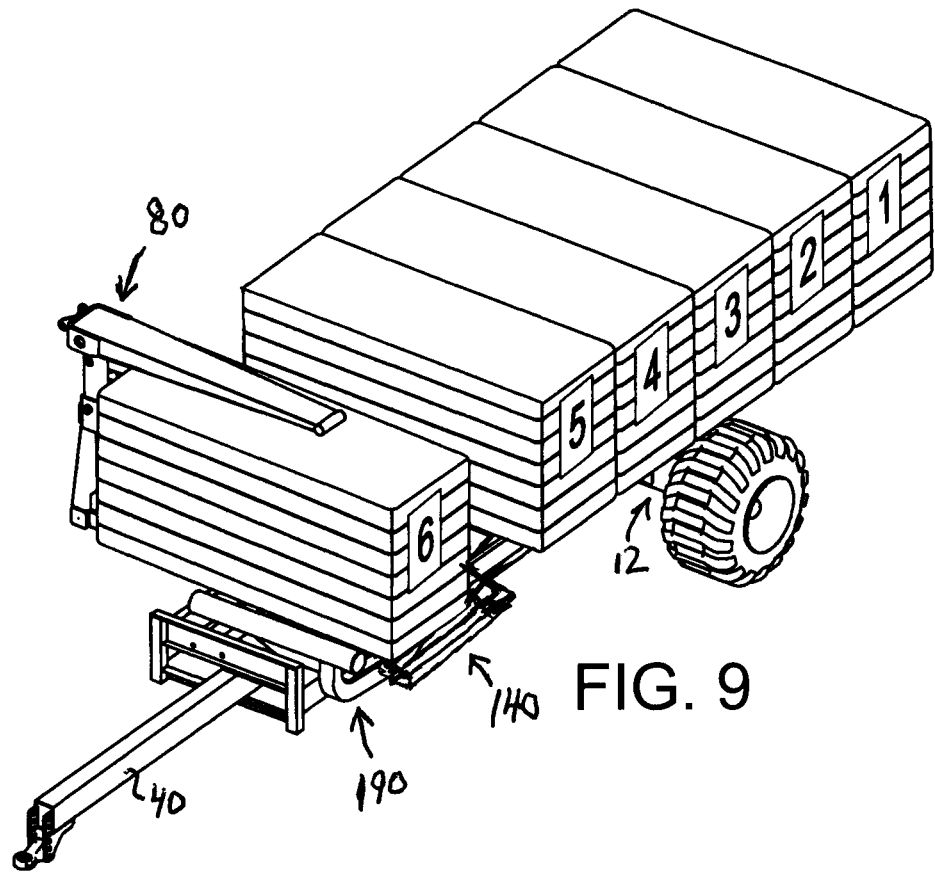
FIG. 9 is a perspective view from above the left front quarter of the stack feeder wagon 8 shown in FIG. 8 showing the wagon draw bar 40 aligned right to left with the longitudinal center axis of the wagon and showing the loader arm assembly 80 in the arm up position clamping a representative bale 6, showing representative bales 1 to 5 on the stack feeder bed assembly 140 in the bed down position, and showing the bale pushback and stack clamping assembly 190 in the pushback pivot arm down position.
Figure 10:
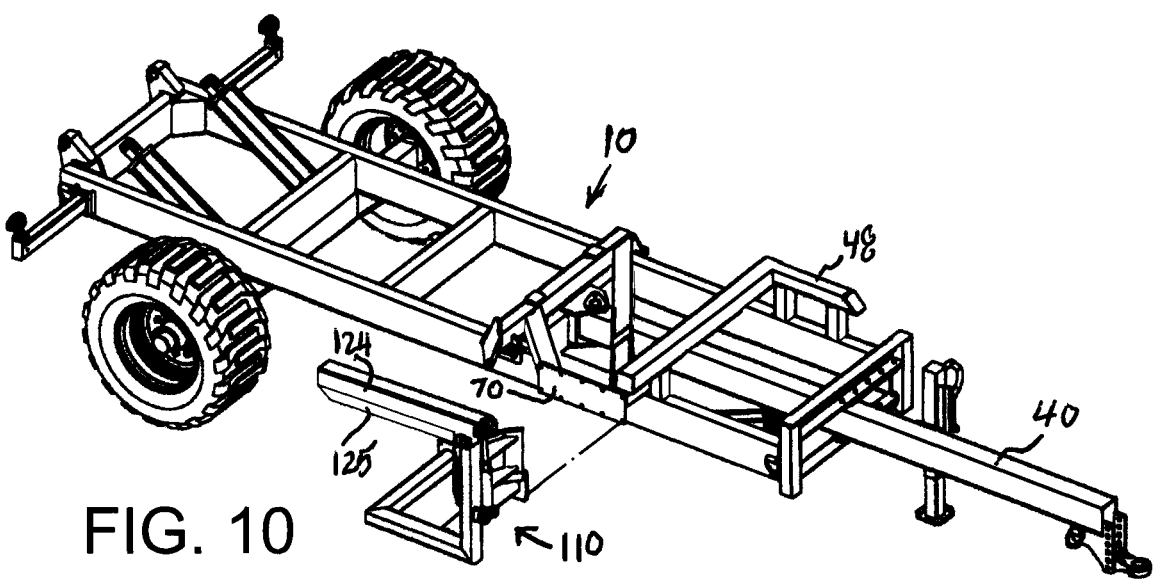
FIG. 10 is a partially exploded perspective view from above the lower support frame assembly 10 shown in FIG. 6 with said bale knife assembly 110 to be attached to said face plate.
Figure 11:
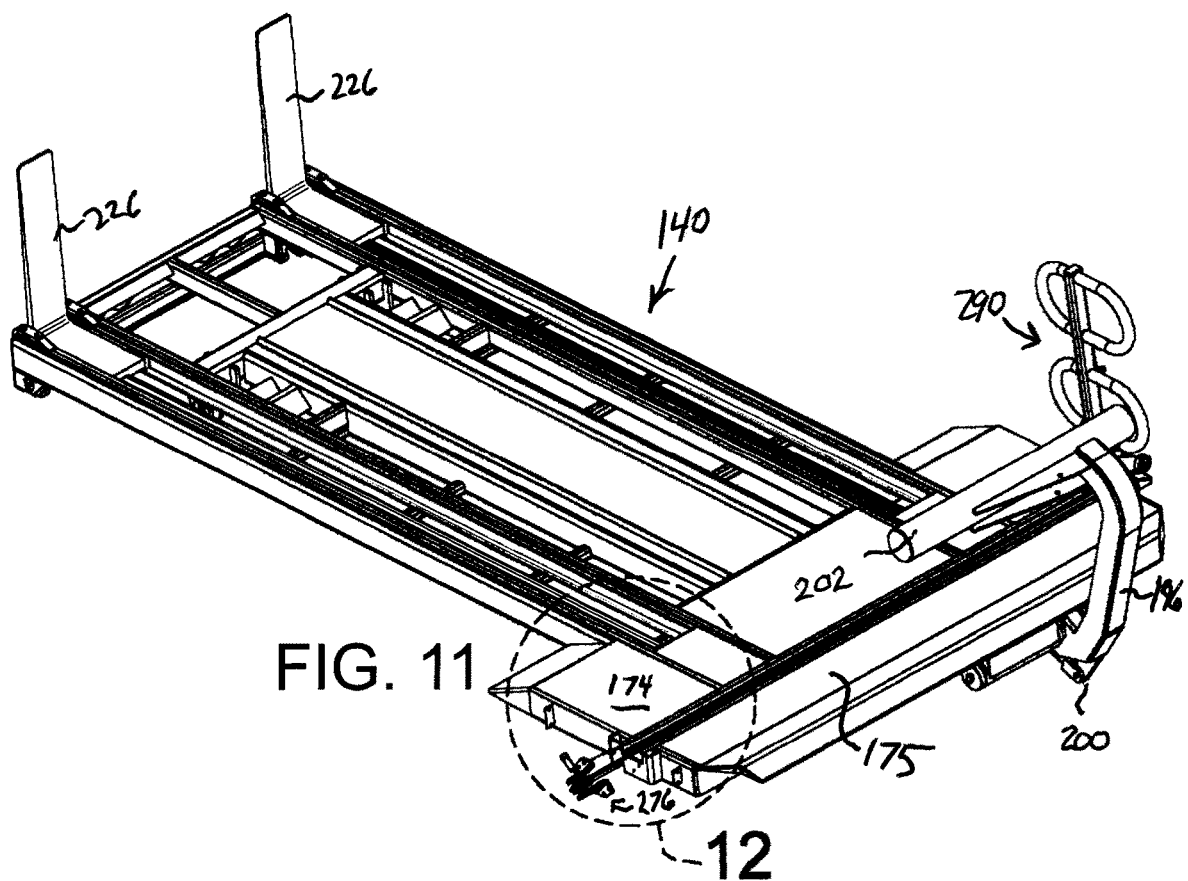
FIG. 11 is a partial, partially exploded perspective view from above the right front portion of said stack feeder bed assembly 140 shown in FIG. 4 showing an exploded view of a right side crossfeed angled cable pulley assembly 276.
Figure 12:
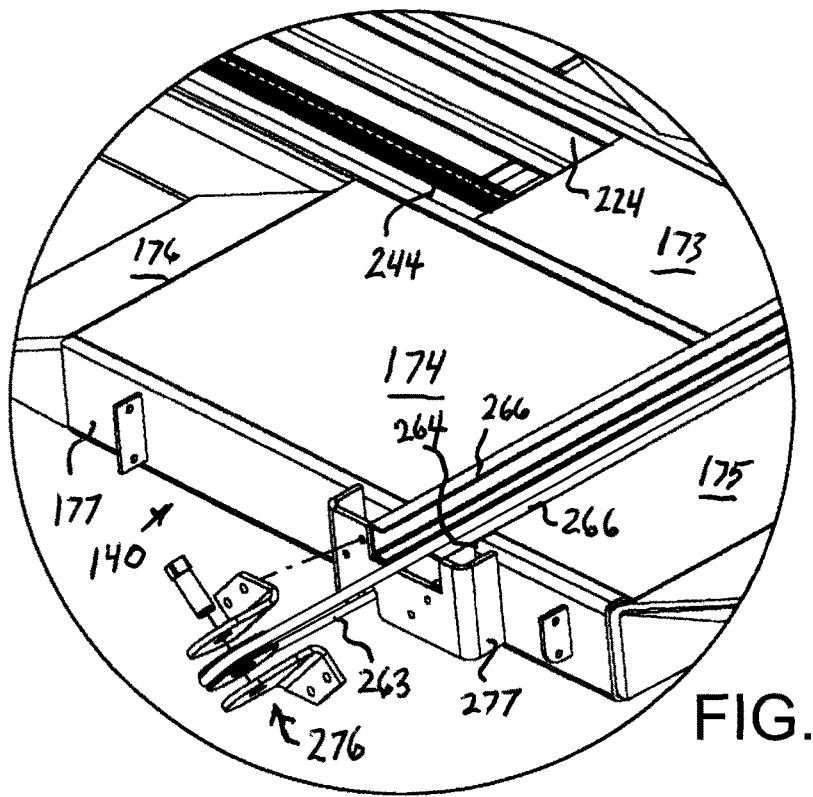
FIG. 12 is an enlarged view of the indicated portion of FIG. 11 showing an exploded view of a right side crossfeed angled cable pulley assembly 276.
Figure 13:
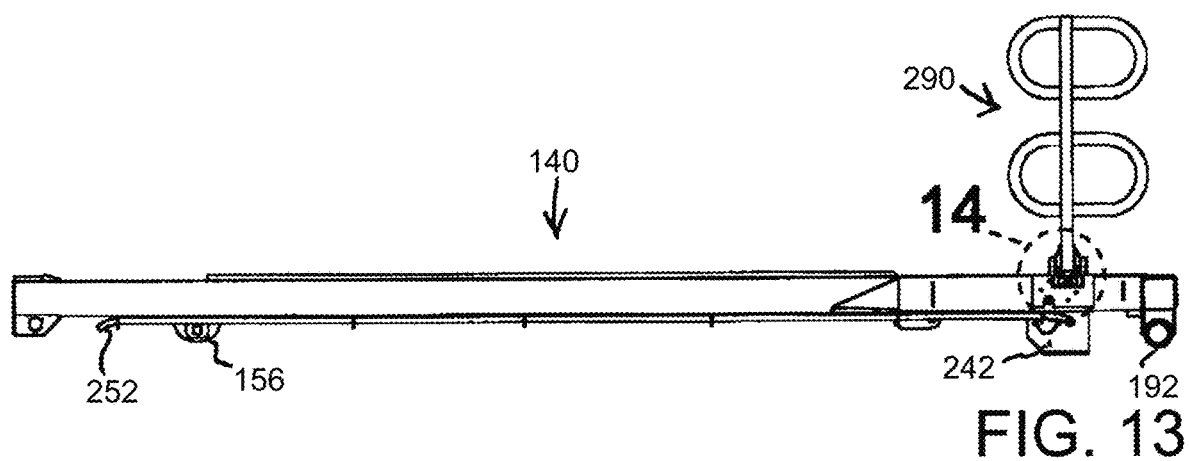
FIG. 13 is a partial side view of the right side of said stack feeder bed assembly 140 shown in FIGS. 1, 4 and 11.
Figure 14:
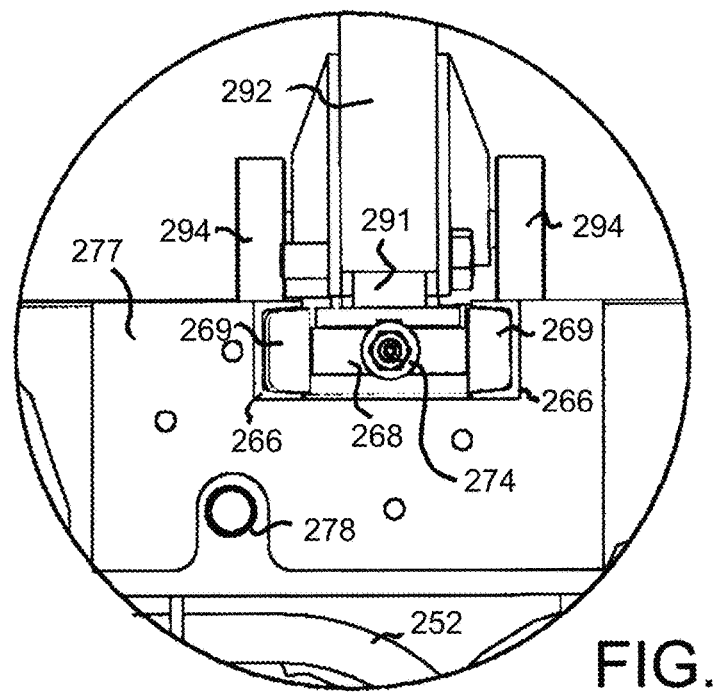
FIG. 14 is an enlarged view of the indicated portion of FIG. 13 showing an end view of a shuttle block 268, a crossfeed cable terminal 274 attached to said shuttle block, and a crossfeed cable protecting conduit 278.

Referring to FIGS. 1 to 51, the present invention is a novel mid-size or big bale stack feeder bed wagon 8 having a novel accessory mount assembly 60 having (mounting) either a novel bale loader arm assembly 60 or having (mounting) a novel bale knife assembly 110, and a novel stack feeder bed assembly 140 having a novel bale fork chain drive assembly 220, a novel bale moving crossfeed cable system 260, and a novel bale pusher fence assembly 290.

The elements of the invention, a mid-size or big bale stack feeder bed wagon 8 comprise: a lower support frame assembly 10, said frame assembly having an accessory mount assembly 60 having a mount face plate 70; said mount face plate selectively and interchangeably can mount to a face plate 85 of a bale loader arm assembly 80 (useful in gathering and depositing bales from a harvest field or bale deposit location) or can mount to a face plate 115 of a bale knife assembly 110 (useful in distributing, cleaving, and feeding bales to animals); a stack feeder bed assembly 140 rearward hinged and attached to said lower support frame assembly; said stack feeder bed assembly having a bale push back and stack clamping assembly 190 attached to a forward portion of said bed assembly (said clamping assembly useful in gathering and depositing bales and useful in distributing and feeding bales to animals), a bale fork chain drive assembly 220 (useful in moving bales on said bed forward on said bed incorporated in said bed assembly), a bale moving crossfeed cable system 260 having a bale pusher fence assembly 280 (useful in moving bales on said bed rightward across a forward transverse portion of said bed for said bales one at a time to be selectively cleaved into selectively thick bale flakes by a pivotable knife arm 124 of said bale knife assembly).

Figure 15:
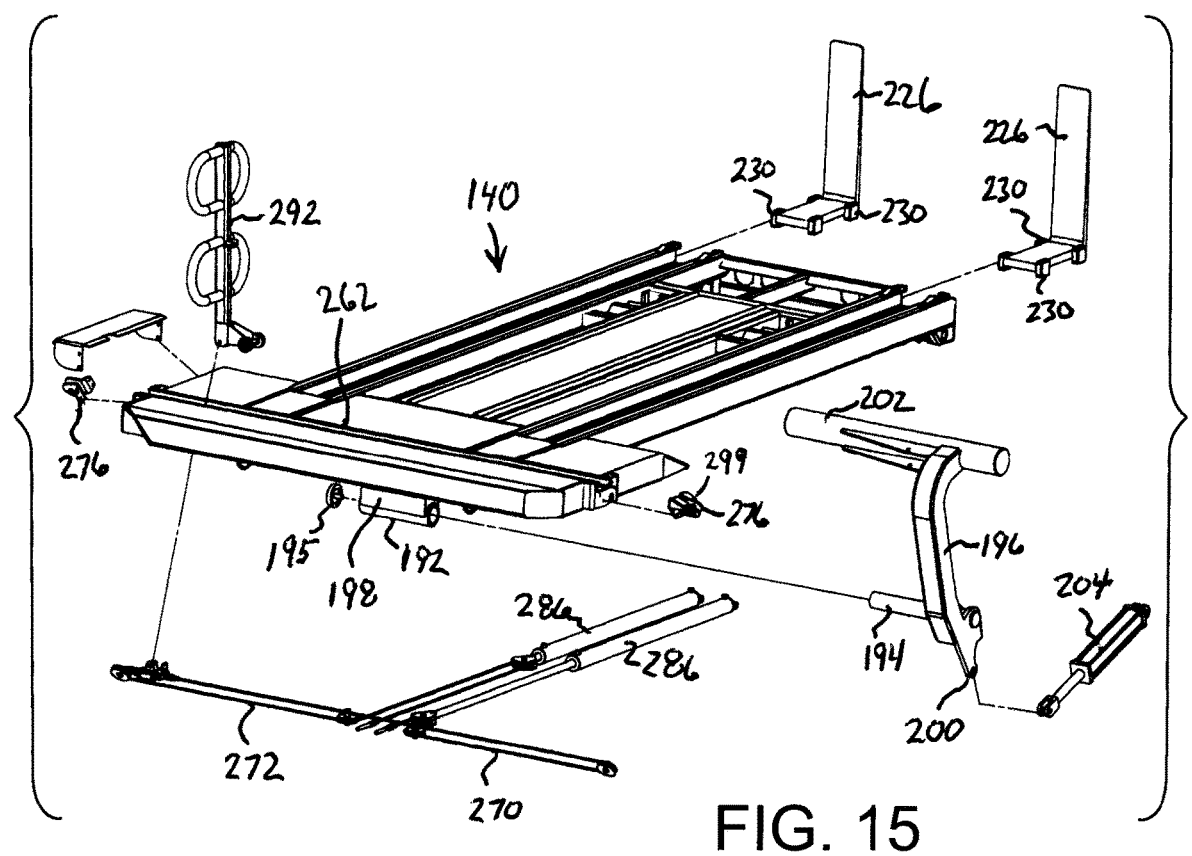
FIG. 15 is a partially exploded perspective view from above the left front portion of said stack feeder bed assembly 140 shown in FIG. 11.
Figure 16:
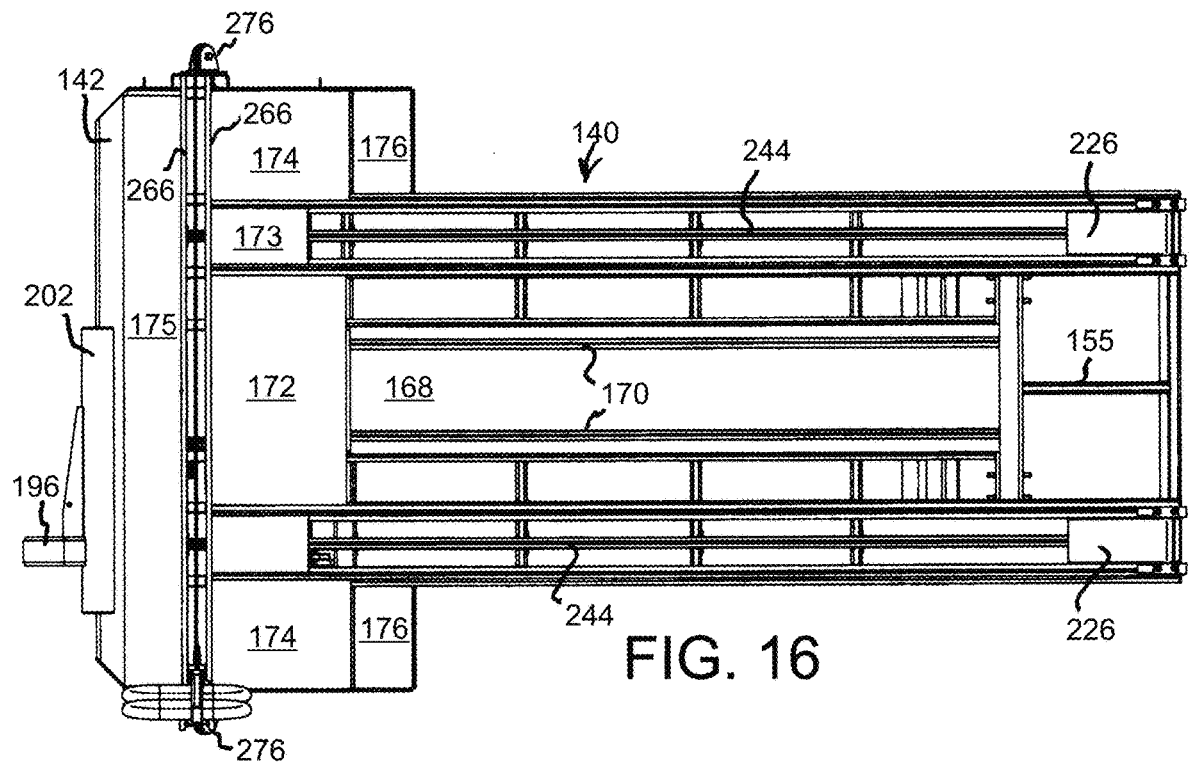
FIG. 16 is a top plan view of the stack feeder bed assembly 140 shown in FIG. 15.
Figure 17:
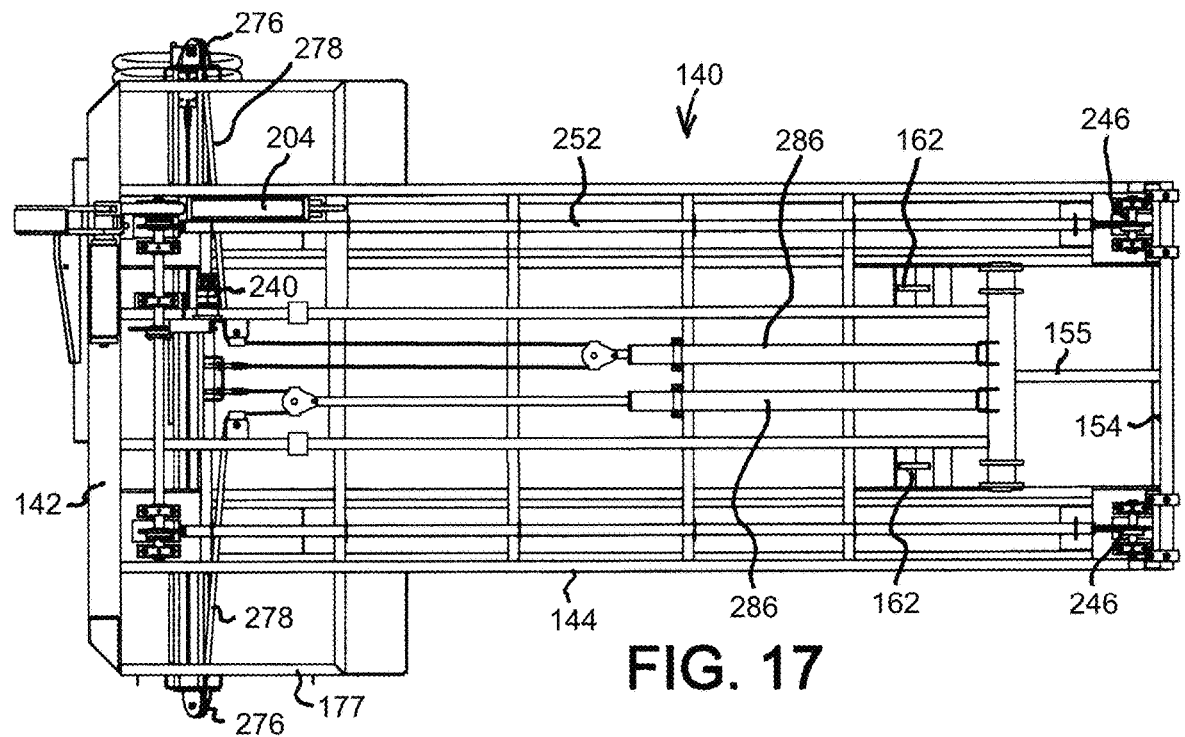
FIG. 17 is a bottom plan view of the stack feeder bed assembly 140 shown in FIG. 16.
Figure 18:
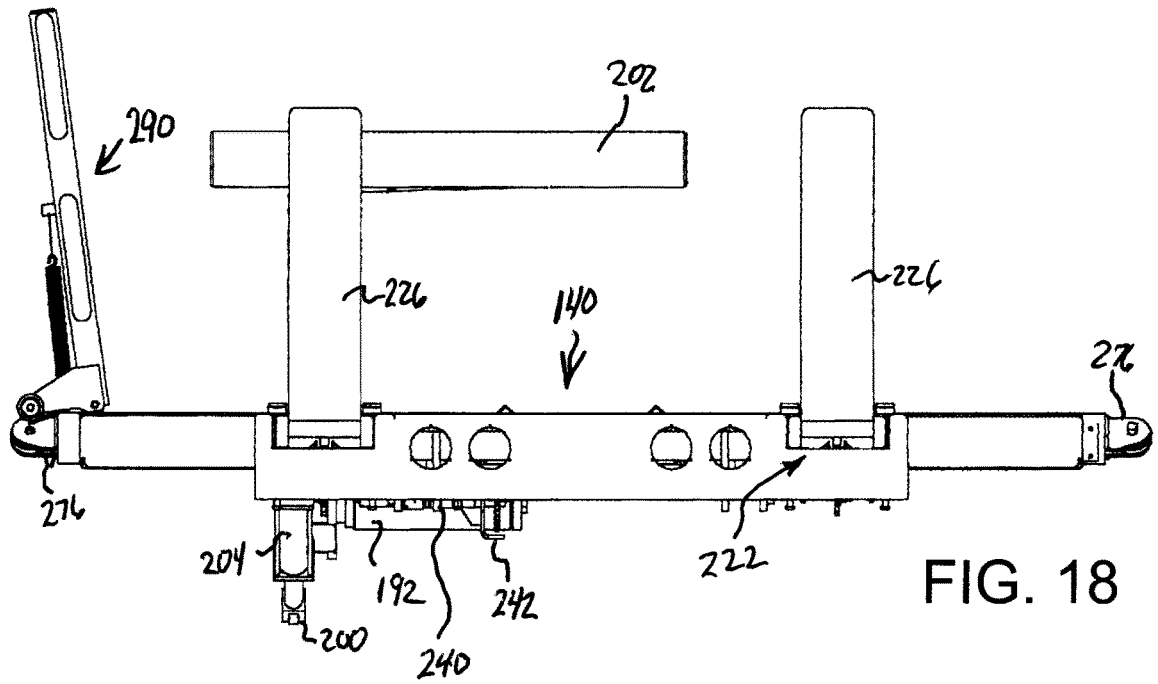
FIG. 18 is a partial rear view of the stack feeder bed assembly 140 shown in FIGS. 16 and 17 (fork retainer clips 179 not shown)
Figure 19:
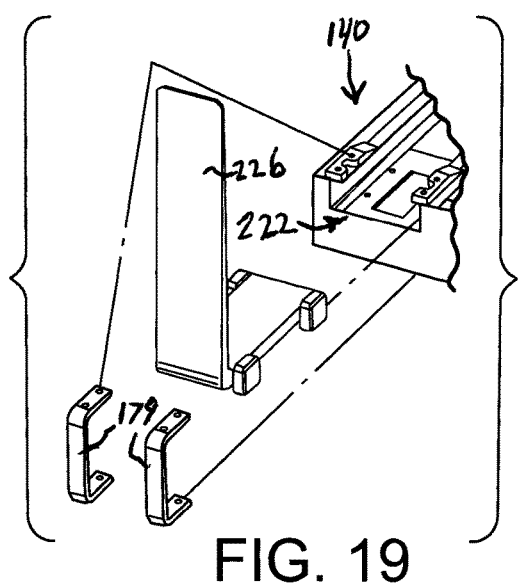
FIG. 19 is a partial exploded rear view of the left rear corner portion of the stack feeder bed assembly 140 shown in FIG. 18.
Figure 20:
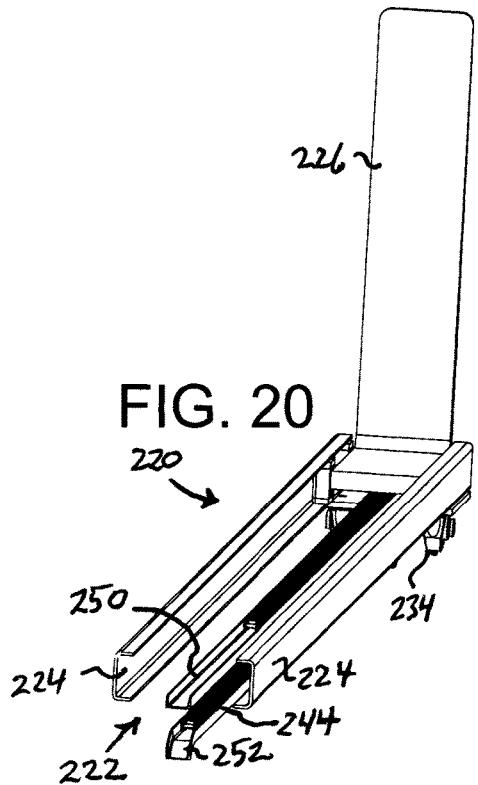
FIG. 20 is a partial perspective view from forward, above, and from the right of a representative rearward portion of a bale fork chain drive assembly 220 of the stack feeder bed assembly 140 showing a retention fork 226 slidingly received, retained, and positioned within a fork track 222 and showing multiple components of said chain drive assembly.
Figure 28:
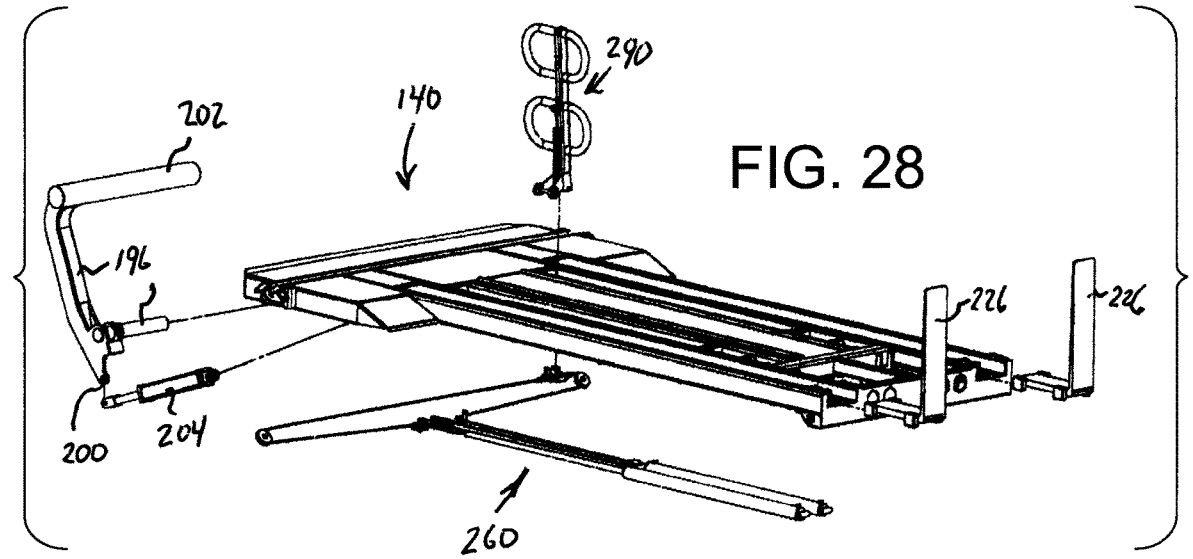
FIG. 28 is a partially exploded perspective view from above the left rear portion of said stack feeder bed assembly 140 showing multiple components of a bale moving crossfeed cable system 260 that selectively may translate a bale pusher fence assembly 280 transversely across the upper forward portion of said bed assembly.
Figure 29:
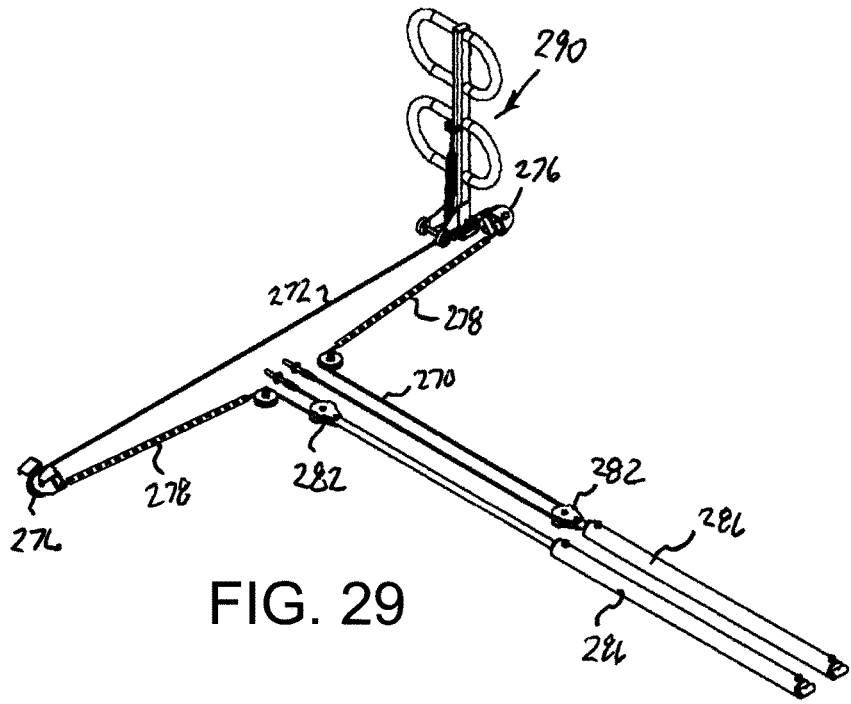
FIG. 29 is a perspective view from above showing most of the major components of a bale moving crossfeed cable system 260 comprising two crossfeed cables 270, 272, a plurality of angled cable pulleys assemblies 276, a plurality of cable protecting conduits 268, a plurality of straight cable pulley assemblies 270, two actuator pulley assemblies 272, a cable end mounting bracket 274, two cooperating cable system actuators 286, and a bale pusher fence assembly 290.
Figure 30:
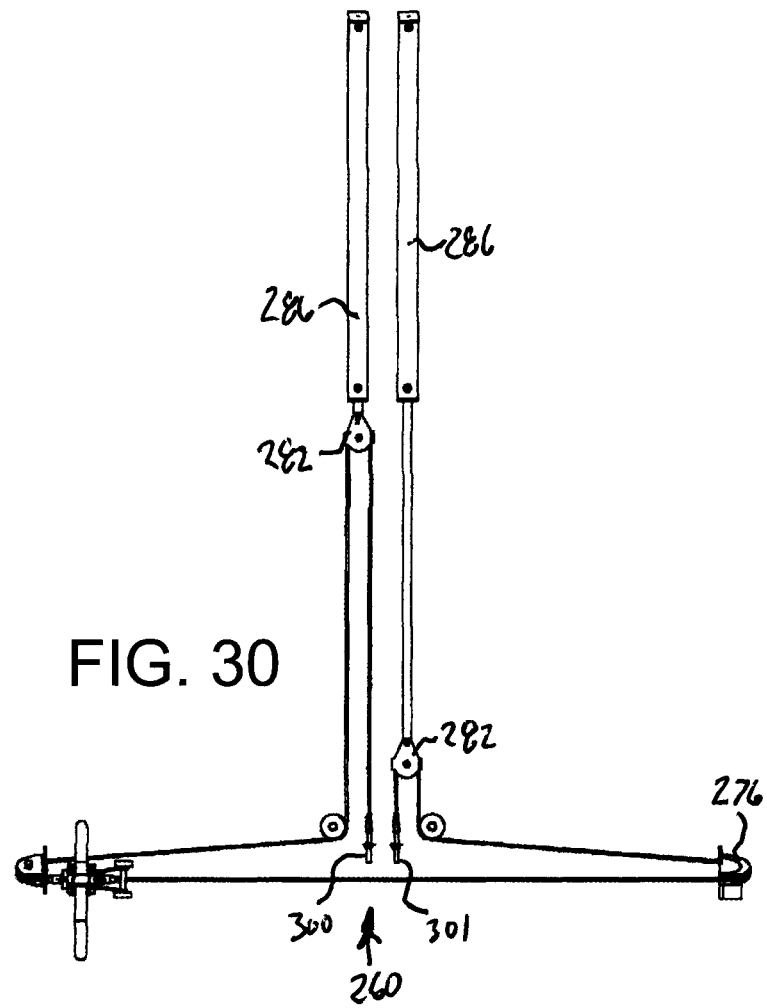
FIG. 30 is a top plan view of most of said crossfeed cable system 260 shown in FIG. 29 comprising two cable system actuators 286, two crossfeed cables 262, 263, a plurality of cable pulleys, two cable anchor ends 300, 301 to be attached to a cable end anchor bracket 274 attached to said bed assembly, and a bale pusher fence assembly 290.
Figure 31:
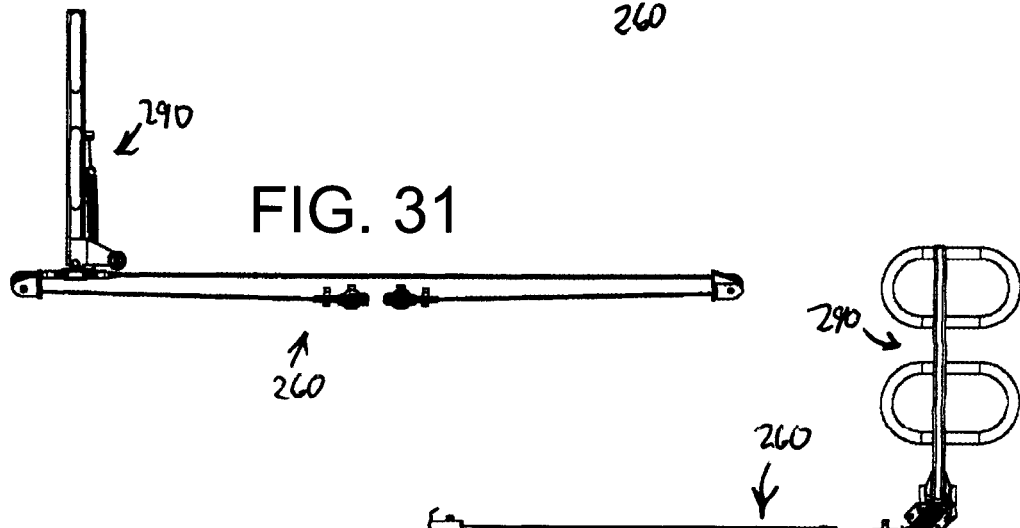
FIG. 31 is a front plan view of said crossfeed cable system 260 shown in FIG. 30.
Figure 32:
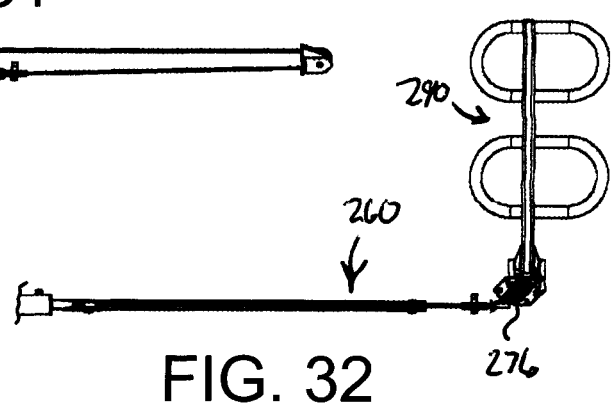
FIG. 32 is a right side view of said crossfeed cable system 260 shown in FIG. 30.
Figure 33:
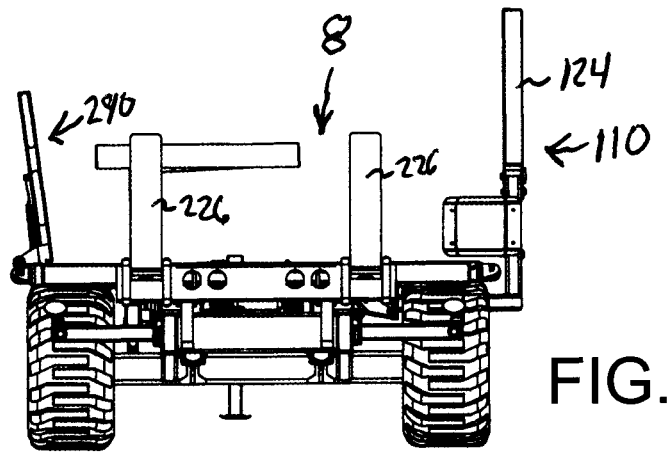
FIG. 33 is a rear view of said stack feeder bed wagon 8 showing a knife assembly 110 attached with said knife arm 124 in a raised position and said bale pusher fence assembly 290 at a leftward-most end position across and relative to said wagon.
Figure 34:
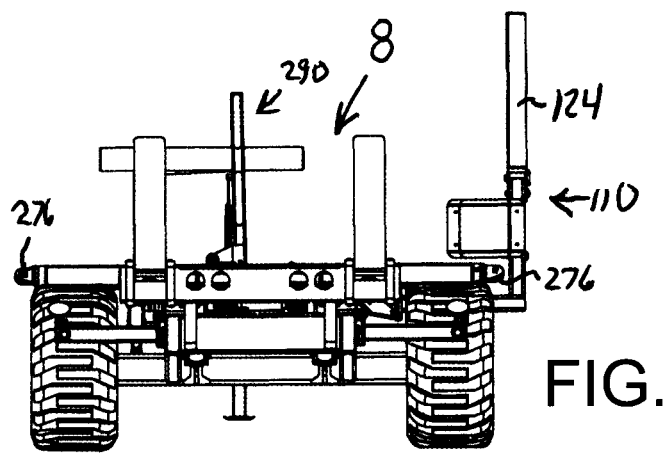
FIG. 34 is a rear view of said stack feeder bed wagon 8 showing said knife assembly attached with said knife arm 124 in a raised position and said bale pusher fence assembly 290 at an intermediate position across and relative to said wagon.
Figure 35:
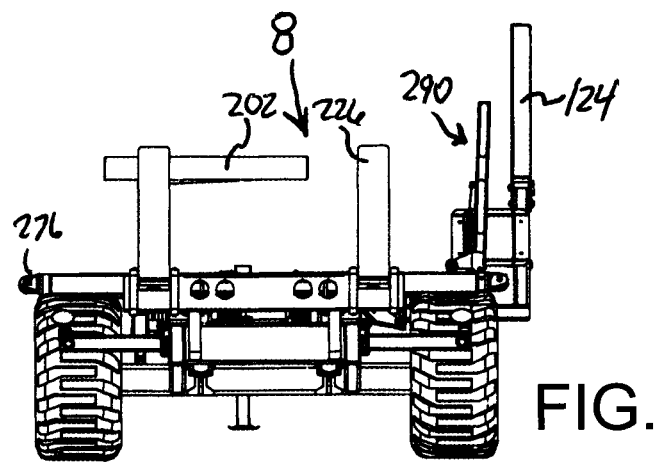
FIG. 35 is a rear view of said stack feeder bed wagon 8 showing said knife assembly attached with said knife arm 124 in a raised position and said bale pusher fence assembly 290 at a rightward-most end position across and relative to said wagon.
Figure 36:
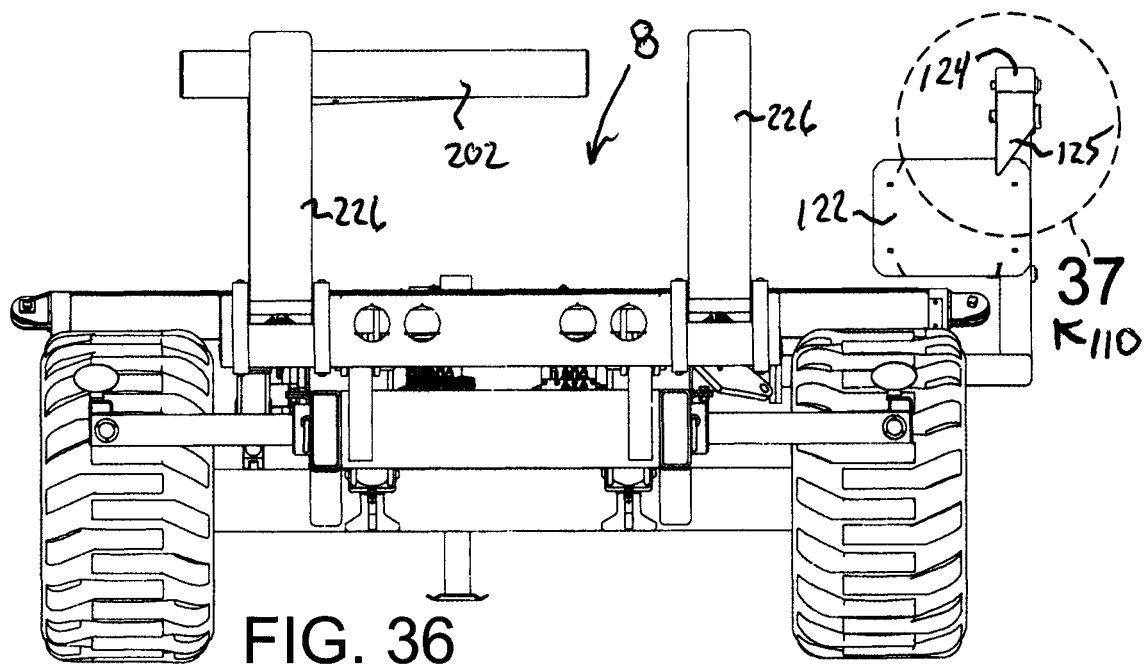
FIG. 36 is a partial, rear view of said stack feeder bed wagon 8 shown in FIG. 33 showing said knife assembly 110 attached with said knife arm 124 having an outward angled side wedge shaped edge profile 125 with a single beveled edge in a lowered knife stroke position (bale pusher fence assembly not shown)
Figure 37:
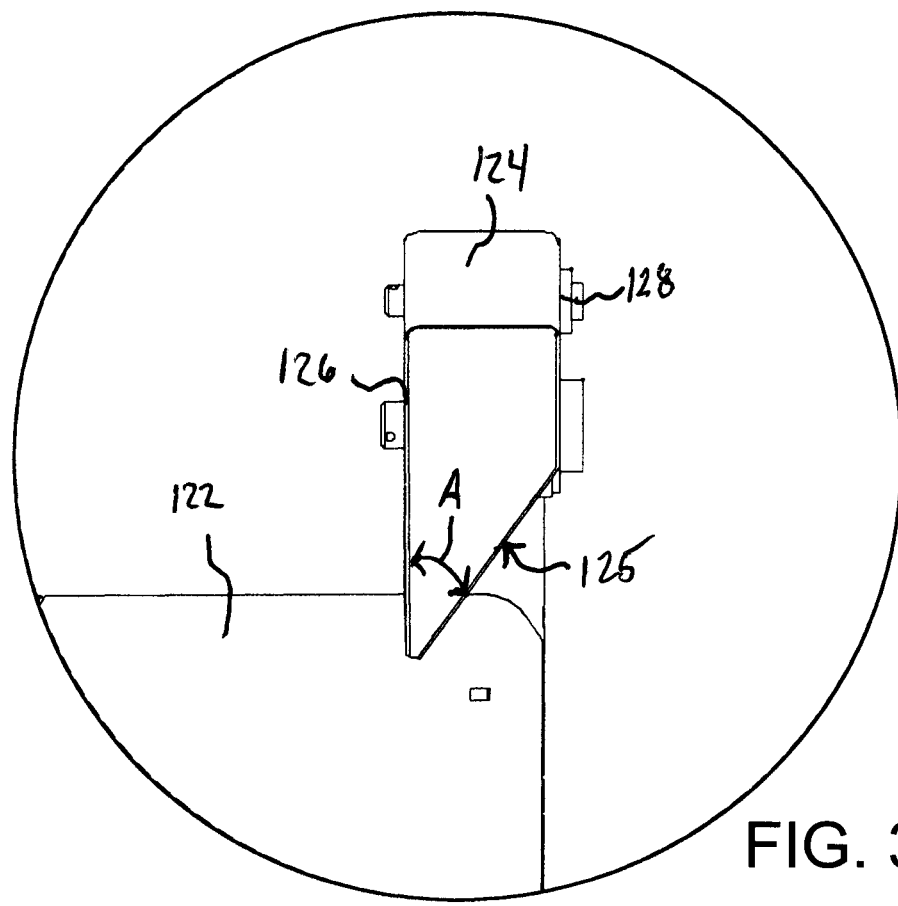
FIG. 37 is an enlarged view of the indicated portion of FIG. 36 and shows a preferred angle A of the edge profile of 36 degrees from the vertical plane of the knife arm stroke (could use an angle between 25 degrees and 50 degrees)
Figure 38:
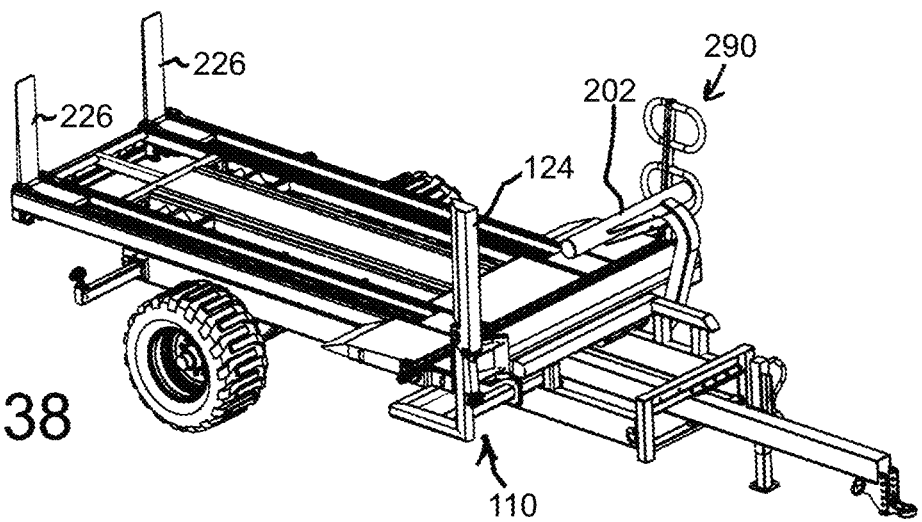
FIG. 38 is a perspective view from above the right front of said stack feeder bed wagon 8 showing said knife assembly 110 attached with said knife arm 124 in a raised position and said bale pusher fence assembly 290 at a leftward-most end position across and relative to said wagon.
Figure 39:
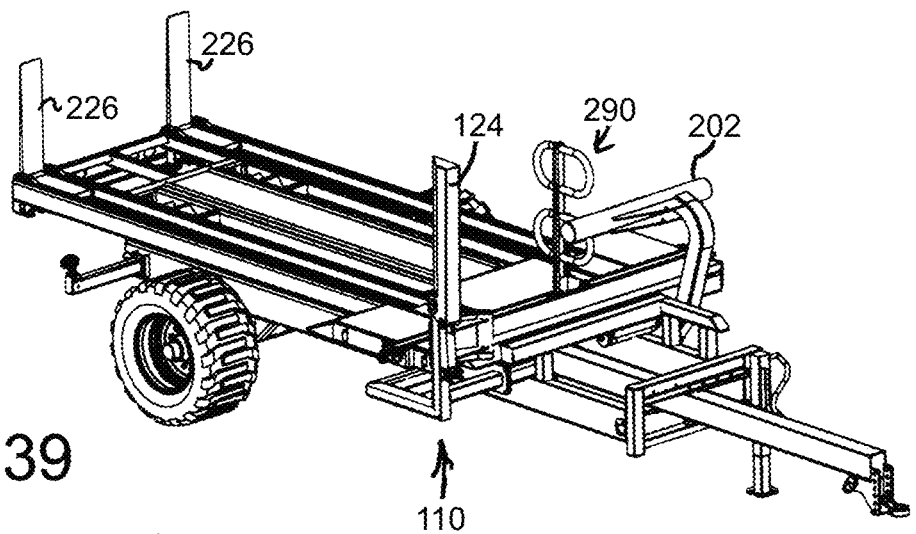
FIG. 39 is a perspective view from above the right front of said stack feeder bed wagon 8 showing said knife assembly 110 attached with said knife arm 124 in a raised position and said bale pusher fence assembly 280 at an intermediate position across and relative to said wagon.
Figure 40:
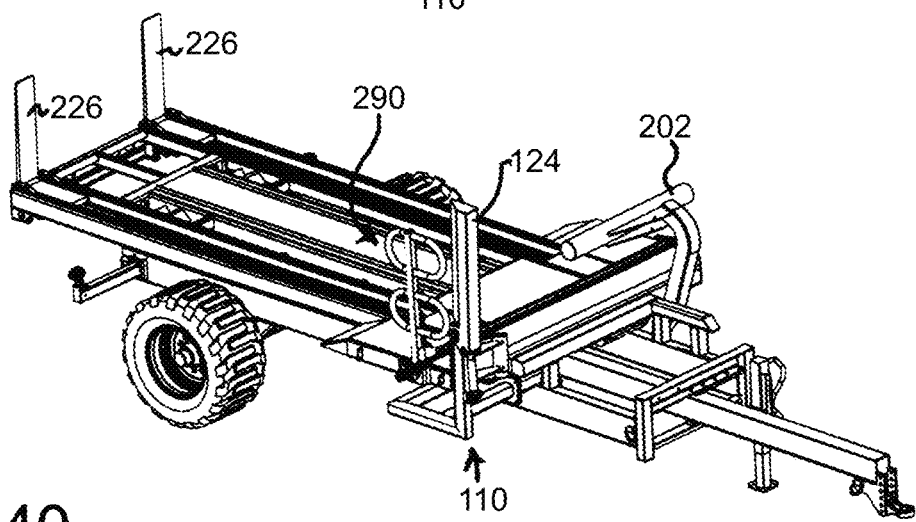
FIG. 40 is a perspective view from above the right front of said stack feeder bed wagon 8 showing said knife assembly 110 attached with said knife arm 124 in a raised position and said bale pusher fence assembly 280 at a rightward-most end position across and relative to said wagon.
Figure 41:
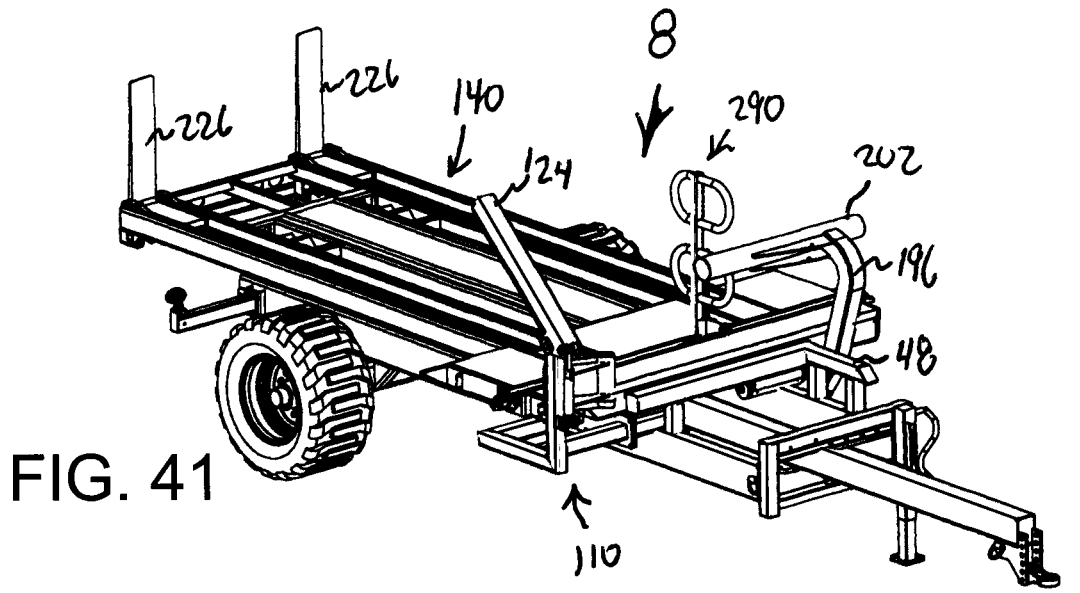
FIG. 41 is a perspective view from above the right front of said stack feeder bed wagon 8 showing said knife assembly 110 attached with said knife arm 124 in an intermediate knife stroke position and said bale pusher fence assembly 290 at an intermediate position across and relative to said wagon.
Figure 42:
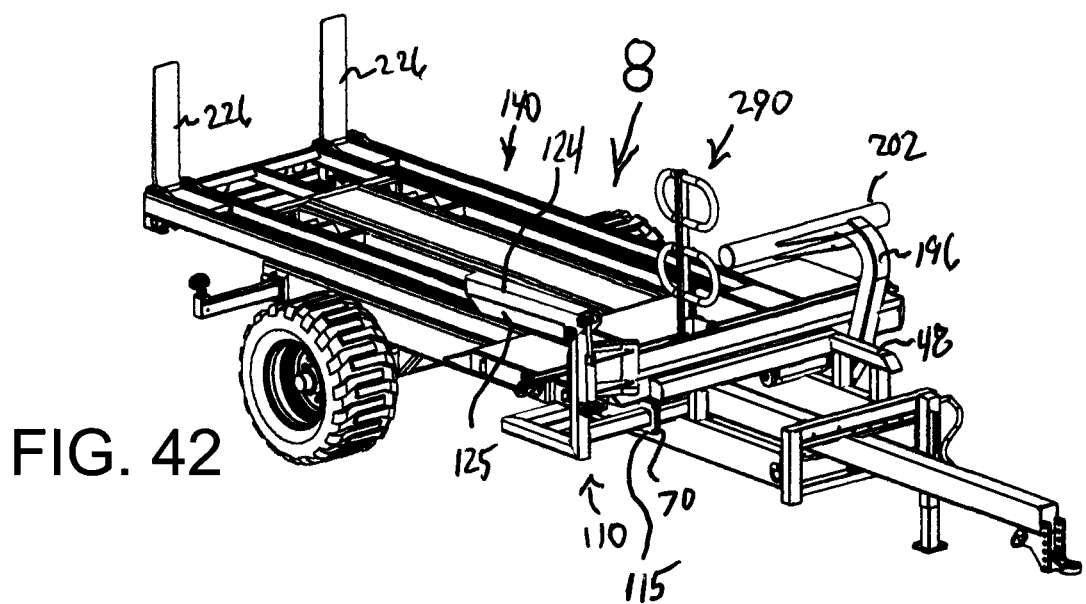
FIG. 42 is a perspective view from above the right front of said stack feeder bed wagon 8 showing said knife assembly 110 attached with said knife arm 124 in a lowered knife stroke position and said bale pusher fence assembly 290 at an intermediate position across and relative to said wagon.
Figure 43:
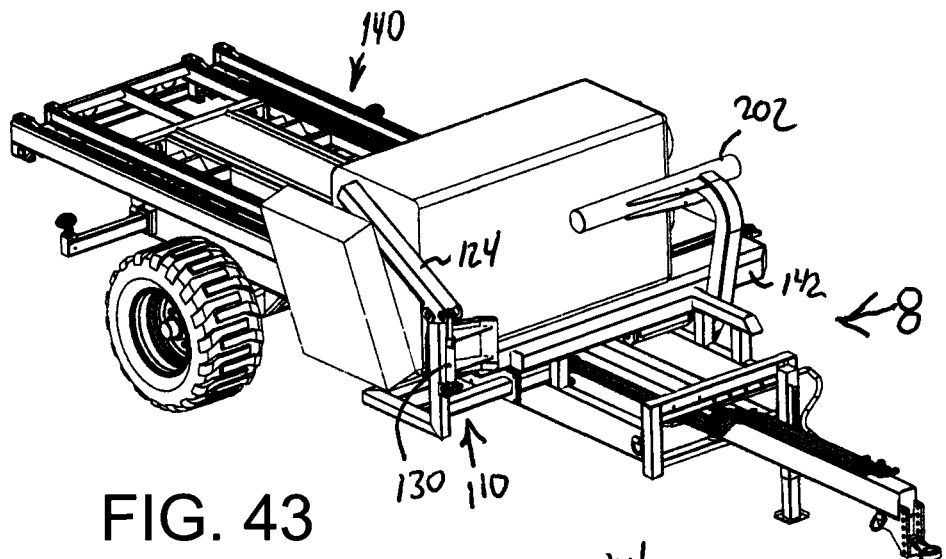
FIG. 43 is a perspective view from above the right front of said stack feeder bed wagon 8 showing said knife arm 124 in an intermediate knife stroke position within an illustrative bale—knife arm cleaving a portion of the bale—and said bale pusher fence assembly 290 at an intermediate position against said bale across and relative to said wagon.
Figure 44:
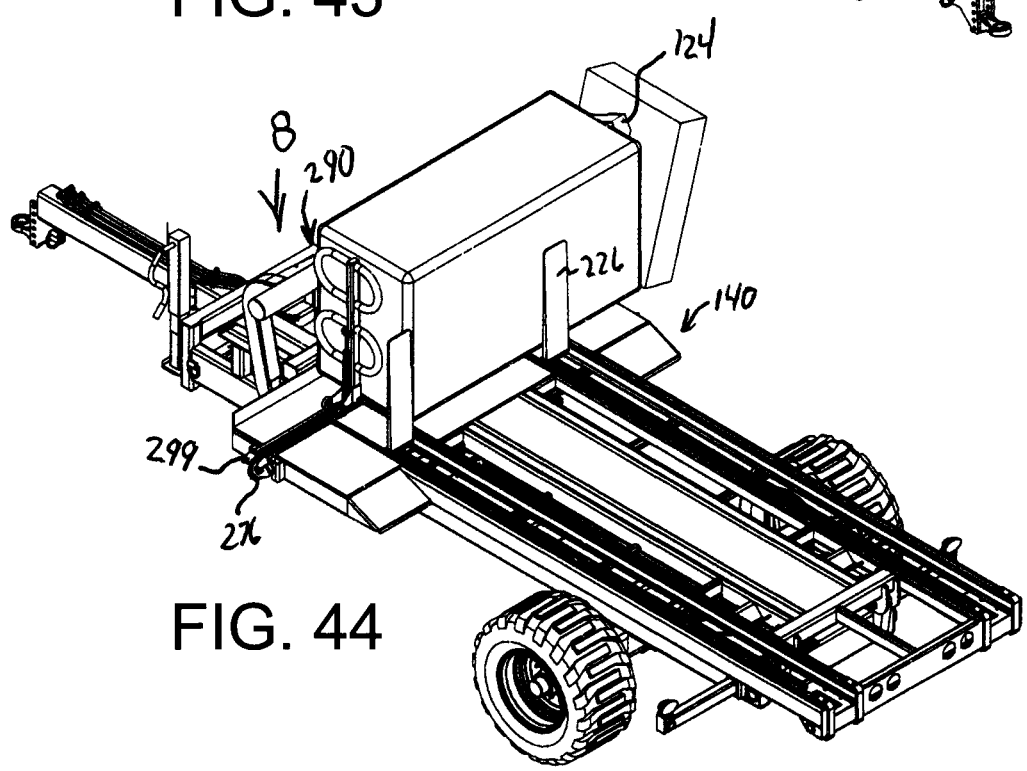
FIG. 44 is a perspective view from above the left rear of said stack feeder bed wagon 8 showing said knife arm 124 in an intermediate knife stroke position within an illustrative bale—said knife arm cleaving a portion of the bale—and said bale pusher fence assembly 290 at an intermediate position against said bale across and relative to said wagon and showing a plurality of bale forks 226 in a forward position against said bale.
Figure 45:
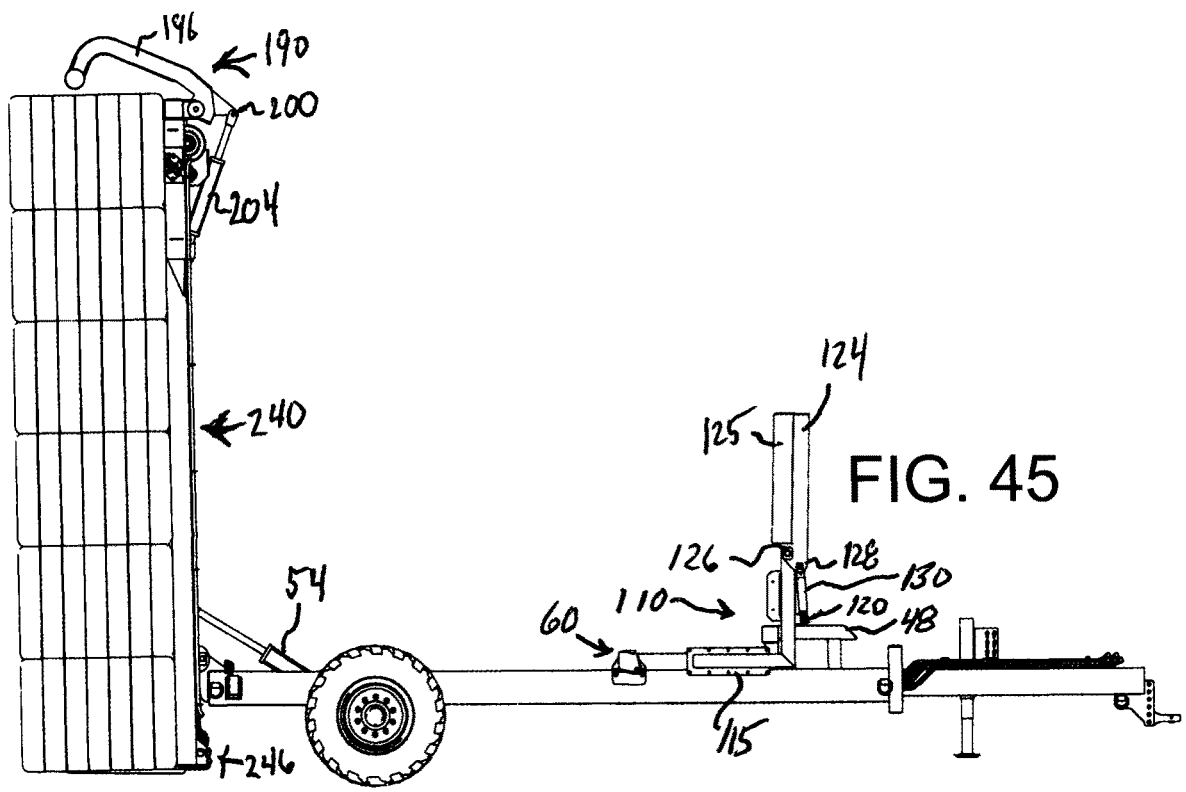
FIG. 45 is a right side plan view of the mid-size or big bale stack feeder bed wagon 8 showing said knife assembly 110 attached with said knife arm 124 in a raised position, showing the stack feeder bed assembly 140 elevated to a bed up position and a stack load of six representative bales against said bed assembly, and showing the bale pushback and stack clamping assembly 190 in a near clamping position against said representative bales.
Figure 46:
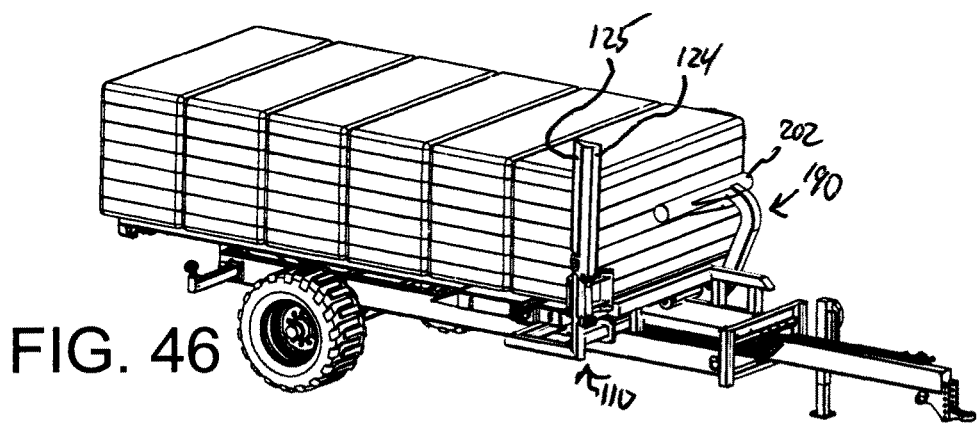
FIG. 46 is a perspective view from above the right front of said stack feeder bed wagon 8 shown in FIG. 45 showing said knife assembly 110 attached with said knife arm 124 in a raised position, showing said stack feeder bed assembly 140 lowered to a bed down position and a stack load of six representative bales on said bed assembly, and showing the bale pushback and stack clamping assembly 190 in a raised bale contacting and bale stabilizing position.
Figure 47:
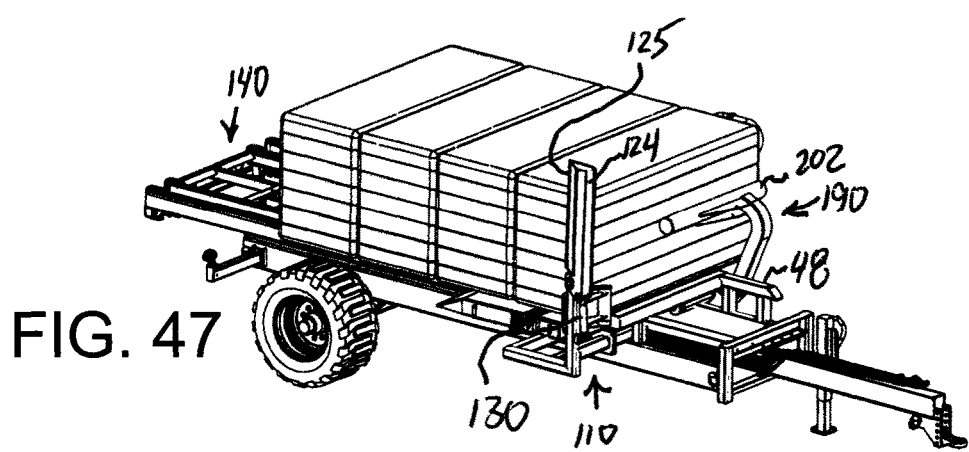
FIG. 47 is a perspective view from above the right front of said stack feeder bed wagon 8 showing said knife assembly 110 attached with said knife arm 124 in a raised position, showing the stack feeder bed assembly 140 lowered to a bed down position and a stack load of four representative bales on said bed assembly, and showing the bale pushback and stack clamping assembly 190 in a raised bale contacting and bale stabilizing position.
Figure 48:
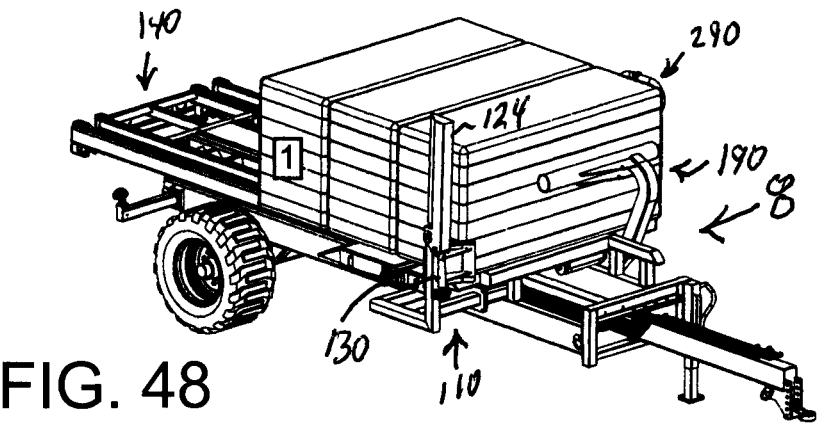
FIG. 48 is a perspective view from above the right front of said stack feeder bed wagon 8 showing said knife assembly 110 attached with said knife arm 124 in a raised position, showing the stack feeder bed assembly 140 lowered to a bed down position and a stack load of three representative bales moved forward on said bed assembly by said bale fork chain drive assembly, and showing the bale pushback and stack clamping assembly 190 in a raised bale contacting and bale stabilizing position.
Figure 49:
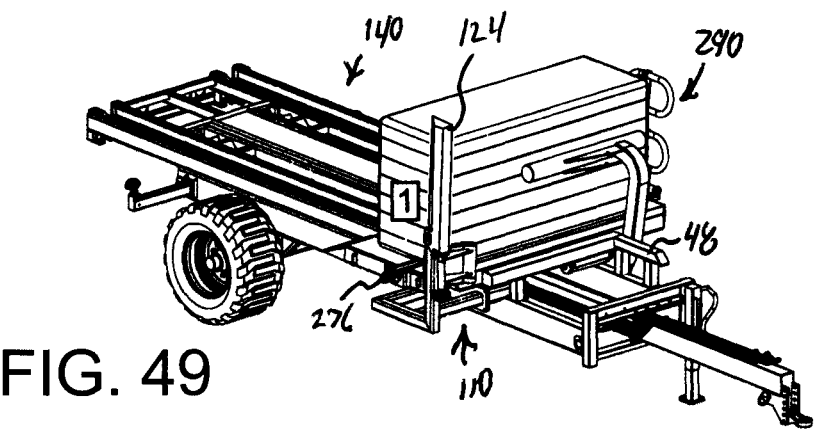
FIG. 49 is a perspective view from above the right front of said stack feeder bed wagon 8 showing said knife assembly 110 attached with said knife arm 124 in a raised position, showing the stack feeder bed assembly 140 lowered to a bed down position and a stack load of one representative bale 1 on said bed assembly not yet fully moved forward to contact said bale pushback and stack clamping assembly 190 in a raised bale contacting and bale stabilizing position.
Figure 50:
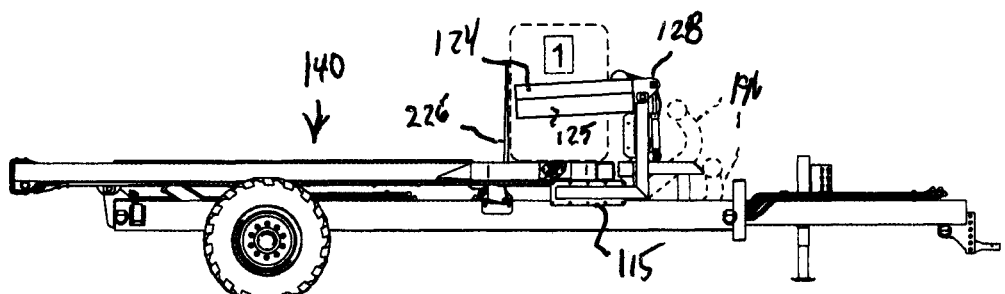
FIG. 50 is a right side plan view of the mid-size or big bale stack feeder bed wagon 8 showing said knife assembly 110 attached with said knife arm 124 in a lowered knife stroke position, showing the stack feeder bed assembly 140 lowered to a bed down position and a stack load of one representative bale 1 on said bed assembly, showing said right bale fork 240 against said bale, showing said bale pushback and stack clamping assembly 190 in a raised bale contacting and bale stabilizing position, and showing alternative positions of said clamping assembly.
Figure 51:
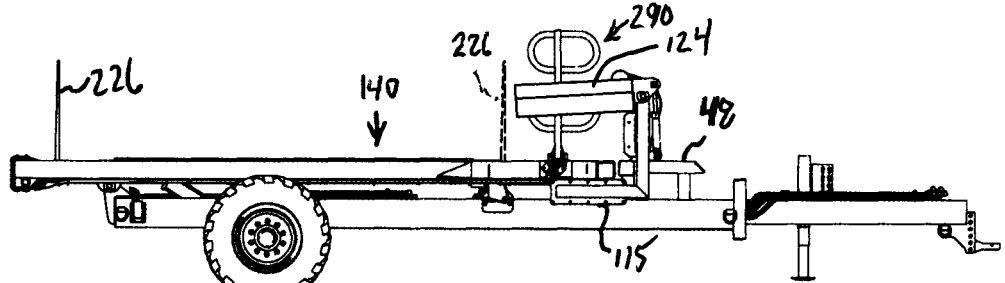
FIG. 51 is a right side plan view of the mid-size or big bale stack feeder bed wagon 8 without a stack load showing said knife assembly 110 attached with said knife arm 124 in a lowered knife stroke position, showing the stack feeder bed assembly 140 lowered to a bed down position, showing said right bale fork 226 at a rearward position and an alternative intermediate position of said bale fork, and showing said bale pushback and stack clamping assembly 190 in a raised bale contacting and bale stabilizing position.

The elements of the invention, a mid-size or big bale stack feeder bed wagon 8 in more detail comprise:

A. a lower support frame assembly 10 comprising:
- a flotation tire wheel and axle assembly 12 having attached at least two flotation tire wheels 14 (said wheels coaxial and attached at opposite ends of said axle assembly), a longitudinal right main rail 16 spaced from a longitudinal left main rail 18, said main rails transversely attached to and supported by said axle assembly, a main rail actuator ear 17 attached to a forward portion of said right main rail between said main rails;
- a front cross open frame 20 transversely attached to and bridging between the forward ends of said main rails, said front cross open frame comprising: an upper cross frame rail 22 spaced from a lower cross frame rail 24, said frame rails attached to and bridging between the respective upper ends and lower ends of both a right cross frame post 26 and a left cross frame post 28, said frame posts spaced one from the other, an upper cross frame pad 30 spaced from a lower cross frame pad 32, said frame pads (preferably made from a low friction UHMW plastic sheet material) attached to facing portions of said upper cross frame rail and said lower cross frame rail;
- a plurality of lower support cross frame members 34 behind said cross open frame distributed and transversely attached to and between said main rails;
- a lower rear cross member 35 transversely attached to and between said main rails;
- a plurality of accessory mount assembly mounting flanges 36 attached to selected upper outer forward portions of said main rails;
- two spaced pairs of stack feeder bed assembly mounting pivot ears 38 attached to outer rear portions of said rear cross member;
- a longitudinal wagon draw bar 40 having a draw bar actuator ear 41 attached to a forward right side portion of said draw bar, said draw bar slidingly received between said frame rails and closely adjacent and between said frame pads and pivotally mounted between said main rails and to a draw bar mount 42 that is attached to a forward middle portion of the first said lower support cross member behind said cross open frame;
- a wagon support jack assembly 43;
- a wagon hitch 44 attached to the distal forward end of said draw bar for attaching said wagon to a prime mover (a farm tractor);
- a draw bar angle adjustment actuator 46 operatively attached to and between said main rail actuator ear and said draw bar actuator ear, said angle adjustment actuator to selectively rotate said draw bar in a horizontal plane;
- a preferably reverse L-shaped picked-up bale support 48 having a longitudinal leg portion attached to a forward upper portion of the left main rail and having a transverse leg portion attached to a forward upper portion of said right main rail;
- a pair of spaced stack bed main actuator mounting ears 50 attached to one of said lower support cross frame members 34 closest to said axle assembly 12;
- a pair of spaced stack bed main actuators 52 pivotally attached to said main actuator mounting ears;

B. an accessory mount assembly 60 attached to said lower support frame assembly, said accessory mount assembly comprising:
- a rear mount cross rail 62 having an accessory mount assembly mounting bracket 74 attached at the left end of said cross rail, and having a loader arm rotation actuator mounting ear 64 attached at the right end of said rear mount cross rail;
- a front mount cross rail 66 spaced forward from the right end of said rear mount cross rail;
- a mount inner diagonal rail 68 attached to and between said rear mount cross rail and said front mount cross rail;
- a longitudinal mount face plate 70 attached to said front mount cross rail, said mount face plate attached to the forward end of a mount outer diagonal rail 72, said mount outer diagonal rail attached to said rear mount cross rail at the rearward end of said mount outer diagonal rail;
- a plurality of accessory mount assembly mounting brackets 74, 76, 78 selectively distributed and attached to lower outer surfaces of said accessory mount assembly to cooperatively connect to a plurality of said accessory mount assembly mounting flanges 36 attached to selected upper outer and inner forward portions of said main rails;
- said accessory mount assembly interchangeably can receive and mount either a. a bale loader arm assembly 80 having a loader arm diagonal rail 82 connected between a loader arm cross support rail 84 and a loader arm assembly face plate 85, said loader arm cross support rail attached to said arm assembly face plate, said arm assembly face plate can be attached to said mount face plate 70 (see FIGS. 1, 7, and 8 regarding attached relationships of the components of said loader arm assembly)(preferably attached using nuts and bolts);

the components of said bale loader arm assembly comprising: a loader arm diagonal rail 82, a loader arm cross support rail 84, a loader arm assembly face plate 85, a loader arm pivot shaft lower sleeve 86, a loader arm pivot shaft upper sleeve 88, a loader arm rotation actuator mounting ear 90, a loader arm rotation actuator 92, a loader arm vertical post 94, an inner bale clamping arm 96, an outer bale clamping arm 98, and a clamping arm actuator 100;

or b. a bale knife assembly 110 having a bale knife assembly face plate 115 that can be attached to said mount face plate 70 (see FIGS. 2, 4-5, 9-10, and 33-51) regarding attached relationships of the components of said bale knife assembly preferably attached using nuts and bolts;

The components of said bale knife assembly comprising: a rear cross frame rail 112 spaced from a front cross frame rail 114, a knife support frame face plate 115, a longitudinal frame rail 116, a frame vertical post 118, a knife actuator mounting ears 120, a bale deflector guide 122, a knife arm 124, a wide-chord wedge shaped knife blade (preferably one facet with leading edge with a wood chisel profile) 125, a knife arm pivot 126, a pair of knife arm pivot actuator mounting ears 128, and a knife arm actuator 130;

C. a stack feeder bed assembly 140 comprising:

a stack feeder bed front cross beam 142 attached to and across the front ends of two spaced outer longitudinal bale support rails 144, two spaced longitudinal intermediate bale support rails 146 spaced between said outer bale support rails, two spaced longitudinal front inner bale support rails 148 spaced between forward portions of said intermediate bale support rails;

a plurality of stack feeder bed intermediate cross members 150 attached to and between said support rails;

a stack feeder bed intermediate cross beam 152 attached to and between said intermediate bale support rails and attached to and across the rear ends of said front inner bale support rails;

a stack feeder bed rear cross beam 154 attached across the rear ends of said outer bale support rails and said intermediate bale support rails;

a longitudinal rear centerline bale support rail 155 inside said intermediate bale support rails attached to and between said stack feeder bed rear cross member and said stack feeder intermediate cross beam;

two pairs of spaced stack feeder bed mounting pivot ears 156 attached to said stack feeder bed intermediate cross beam;

a plurality of spaced cable actuator mounting ears 158 attached to outer forward surfaces of said intermediate cross beam;

two stack feeder mounting pivot pins 159 inserted and retained in cooperating said stack feeder bed assembly mounting pivot ears and said stack feeder bed mounting pivot ears to pivotably join said lower support frame to said stack feeder bed assembly;

two spaced main actuator mounting cross members 160 attached to and between respectively one of said intermediate bale support rails and the respective facing one of said front inner bale support rails;

two spaced stack feeder bed elevating ears 162 attached to selected lower portions of said actuator mounting cross member and said elevating ears pivotally attached to the upper distal ends of said main actuators;

a pushback actuator mounting cross member 164 spaced rearward from said stack bed front cross beam and attached to and between said left outer bale support rail and the closer facing front intermediate bale support rail 146;

a pushback pivot ear 166 attached to a selected lower portion of said pushback actuator mounting cross member;

one or more upper central bed skin panels 168 attached to selected upper central portions of said bed assembly;

a plurality of raised longitudinal bale directing ridges 170 attached to selected said upper central bed skin panels;

one or more upper intermediate bed skin panels 172, 173, 174 attached to one or more upper intermediate portions of said bale support rails forward of said upper central bed skin panels;

one or more upper forward bed skin panels 175 attached to upper portions of one or more upper forward portions of said bale support rails and spaced forward of said upper intermediate bed skin panels and preferably attached to an upper rearward portion of said stack feeder bed front cross beam;

a plurality of upper forward rearward sloped outer wing skin panels 176 attached to outer and intermediate portions of said outer longitudinal bale support rails, and the upper surfaces of two longitudinal spaced outer wing rails 177, said wing rails spaced outward from said outer longitudinal bale support rails, said wing rails each having a tapered rear portion that slopes downward from the horizontal plane of the upper surface of said outer bail support rails to the lower surface of said outer bail support rails;

a plurality of interstitial contact pads 178 selectively attached to portions of facing elements of said bed assembly; and a plurality of spaced bale fork retention clips 179 attached to rear portions of said stack feeder bed assembly;

D. a bale push back and stack clamping assembly 190 comprising:

a transverse pushback pivot mounting sleeve 192 attached to and spaced from and below a selected left portion of said stack feeder bed front cross beam to rotatably receive and retain a transverse pushback pivot shaft 194, said pivot shaft transversely attached to an intermediate portion of a pushback pivot arm 196 (preferably J-shaped), said pivot shaft secured in said mounting sleeve by a sleeve end cap 195 secured by a center retention bolt in a centerline end bore of said pivot shaft;

a plurality of mounting sleeve cheek gussets 198 attached to and between said mounting sleeve and said front cross beam;

a pushback actuator mounting ear 200 attached to a selected portion of said pushback arm radially spaced from the rotational axis of said pivot shaft;

a bale pushback cross member 202 connected distally to said pushback arm and preferably radially spaced from the rotational axis of said pivot shaft; and a pushback actuator 204 pivotally attached to and between said actuator mounting ear and said pushback pivot ear;

E. a bale fork chain drive assembly 220 comprising:

two spaced longitudinal fork tracks 222 each said fork track formed from two open-ended equal-length spaced and facing C-channels 224, each said fork track C-channel attached to respective facing inner longitudinal side surfaces of said outer bale support rails and respective facing inner longitudinal side surfaces of said intermediate bale support rails, each said fork track sized to slidingly receive a rectangular lower leg portion of an L-shaped bale retention fork 226;

preferably each said lower leg portion having four or more cube shaped fork track lugs 228 sized and attached or formed at the four corners of the rectangular lower leg portion that extend laterally outward away from the longitudinal sides of said lower leg portion in a common horizontal plane to be slidingly received in one of said respective fork tracks;

preferably each said fork track lug is capped by a UHMW low-friction plastic cap 230 sized to be slidingly received in said respective fork tracks;

a forward mounted transverse drive shaft 232 rotatably mounted to a selected forward lower portion of said bed assembly by a plurality of pillow block bearings 234, said drive shaft having a sprocketed drive wheel 236 attached and two spaced forward chain drive wheels 238 attached;

a chain drive motor 240 mounted to a motor mount bracket 242 attached to a selected forward lower portion of said bed assembly and said motor operatively connected by a motor drive chain to said sprocket drive wheel to selectively rotate under operator control to start or stop clockwise or counter-clockwise rotation of said drive shaft and the attached said drive wheel and said sprocket wheels;

two bale fork drive chains 244 operatively are connected between said forward chain drive sprocket wheels and two coaxial spaced bale fork chain drive rearward sprocket wheel assembly 246 each wheel assembly having a sprocket wheel and said sprocket wheel assembly mounted transversely opposite one from the other to rear lower portions of said bed assembly by a plurality of pillow block bearings 234 and aligned to operatively cooperate and rotate contemporaneously with said forward chain drive sprocket wheels;

each said bale fork drive chain pivotally attached to a chain attachment lug 248 located on the lower surface of each said lower leg;

two spaced open longitudinal upper fork chain channels 250 aligned and attached to said bed assembly and sized to slidingly receive and cooperate with one of said respective fork drive chains;

two spaced open longitudinal lower fork chain channels 252 aligned and attached to said bed assembly spaced and below said upper chain channel and sized to slidingly receive and cooperate with one of said respective fork drive chains;

F. a bale moving crossfeed cable system 260 comprising:

a shuttle block track 262 attached to and across a selected forward transverse upper portion of said bed assembly preferably said shuttle block track mounted to said bed assembly within a plurality of transverse aligned same-sized rectangular shuttle block track receiving notch 264 transversely formed in a selected upper forward portion of each of said bale support rails with said notches transversely aligned one to another across the width of said bed assembly, said notches sized to receive two spaced facing and open-ended C-channels 266 that are attached within said notches to form said shuttle block track sized to slidingly receive and retain within said shuttle block track a slidable shuttle block 268, preferably said shuttle block having two slider blocks 269 mounted on opposite sides of said shuttle block (preferably said slider blocks are made of low friction UHMW plastic), said shuttle block attached at each block end to a respective first end of two equal-length cooperating crossfeed cables 270, 272, preferably said cables each have a first cable end and a second cable end and are high tensile strength multi-strand wire cables and said first cable ends are secured to said shuttle block by two respective linearly aligned crossfeed cable terminals 274 that are pivotally attached to respective ends of said shuttle block (see FIG. 23); said second cable ends 300, 301 and said two crossfeed cables are respectively and operatively engaged and operatively are in contact with or threaded and retained through two respective angled pulley assemblies 276 attached outward beyond the ends of said shuttle block track, preferably two pulley assembly mounting brackets 277 are attached between each said angled pulley assembly and said bed assembly, then said crossfeed cables are operatively threaded in towards the longitudinal centerline of said bed assembly through two respective crossfeed cable conduits 278 mounted linearly through selected portions of said bail support rails, then threaded in operative contact with two respective intermediate pulley assemblies 280 attached to selected respective portions of said bed assembly, then threaded in operative contact with two respective crossfeed cable actuator pulley assemblies 282, and then said second cable ends 300, 301 are attached and anchored to a cable end anchor bracket 284 attached to a selected lower portion of said bed assembly, each said actuator pulley assembly respectively and operatively attached each to one of two respective same size cooperating cable system actuators 286, said actuators attached respectively to said spaced cable actuator mounting ears;

G. a bale pusher fence assembly 290 comprising:

a connecting plate 291 attached to said shuttle block;

a bale pusher fence post 292 that extends above said bed assembly and pivotally attached to said connecting plate by a connecting pin 293;

a pair of offset spaced opposing coaxial fence assembly wheels 294 attached to the left side of the lower end of said fence post with said wheels bridged across and above said shuttle track;

a wheel and fence tensioning spring 296 attached between said fence post on the same side as said wheels to said connecting plate;

one or more bale pusher members 298 attached to a selected portion or portions of said fence post (preferably said pusher members extend from said fence post longitudinally to said bed assembly);

and preferably a left side outward and angled downward fence assembly wheel ramp 299 attached to said bed assembly proximate to said left side angle pulley assembly (see FIG. 15).

The eight actuators of the invention are powered preferably by a hydraulic system of the vehicle that is pulling the stack feeder bed wagon and the hydraulic lines are not shown to allow a clearer viewing of the structural elements of the invention. A majority of the structural components of the invention are preferably made from sheet steel stock, round or square steel tubing stock, or suitable materials used in making the preexisting bale wagons. Means of attaching or joining of elements of the invention one to another may be welding, nuts and bolts, and cotter pins, and other means known in the art.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

We claim:

1. A stack feeder bed wagon comprising: a lower support frame assembly; a bale loader arm assembly interchangeable with a bale knife assembly; selectively said loader arm or said bale knife assembly removably attached to an accessory attachment face plate attached to top portions of said frame assembly; and a stack feeder bed assembly pivotally connected to said frame assembly; a bale pushback and stack clamping assembly attached to a front portion of said stack feeder bed assembly; said stack feeder bed assembly having a bale crossfeed cable assembly in a forward portion; and said stack feeder bed assembly having a chain drive to longitudinally translate a pair of spaced bale forks fore and aft along the upper portions of said bed assembly; and a bale moving crossfeed cable system.

* * * * *